United States Patent
Tsukagoshi

(10) Patent No.: US 10,614,823 B2
(45) Date of Patent: Apr. 7, 2020

(54) TRANSMITTING APPARATUS, TRANSMITTING METHOD, RECEIVING APPARATUS, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 146 days.

(21) Appl. No.: 15/775,154

(22) PCT Filed: Dec. 6, 2016

(86) PCT No.: PCT/JP2016/086280
§ 371 (c)(1),
(2) Date: May 10, 2018

(87) PCT Pub. No.: WO2017/099092
PCT Pub. Date: Jun. 15, 2017

(65) Prior Publication Data
US 2018/0322888 A1    Nov. 8, 2018

(30) Foreign Application Priority Data
Dec. 8, 2015   (JP) .................. 2015-239751

(51) Int. Cl.
*G10L 19/00* (2013.01)
*G10L 19/16* (2013.01)
(Continued)

(52) U.S. Cl.
CPC ............ *G10L 19/167* (2013.01); *G10L 15/00* (2013.01); *G10L 19/00* (2013.01); *G10L 19/018* (2013.01); *G10L 21/00* (2013.01)

(58) Field of Classification Search
CPC ... G10L 19/167; G10L 19/00; G10L 19/0017; G10L 19/0018; G10L 19/008; G10L 19/02; G10L 19/022; G10L 19/03
(Continued)

(56) References Cited

U.S. PATENT DOCUMENTS 8,582,956 B1   11/2013   Hegde et al.
2001/0029540 A1*  10/2001  Ito .................. G06F 3/16
                                              709/230
(Continued)

FOREIGN PATENT DOCUMENTS

JP   2009-500976 A    1/2009
JP   2011-203480 A   10/2011
(Continued)

OTHER PUBLICATIONS

Extended European Search Report dated Oct. 2, 2018 in Patent Application No. 16872990.3, 7 pages.
(Continued)

*Primary Examiner* — Qi Han
(74) *Attorney, Agent, or Firm* — Oblon, McClelland, Maier & Neustadt, L.L.P.

(57) ABSTRACT

A process of an audio stream on a receiving side is facilitated.
Encoding processing is performed on audio data and an audio stream in which an audio frame including audio compression data is continuously arranged is generated. Tag information indicating that the audio compression data of a predetermined sound unit is included is inserted into the audio frame including the audio compression data of the predetermined sound unit. A container stream of a predetermined format including the audio stream into which the tag information is inserted is transmitted.

18 Claims, 25 Drawing Sheets

(51) Int. Cl.
   *G10L 21/00* (2013.01)
   *G10L 15/00* (2013.01)
   *G10L 19/018* (2013.01)

(58) Field of Classification Search
   USPC ............... 704/500, 501, 502, 503, 504, 278
   See application file for complete search history.

(56) References Cited

U.S. PATENT DOCUMENTS

| | | |
|---|---|---|
| 2007/0025538 A1 | 2/2007 | Jarske et al. |
| 2010/0070284 A1* | 3/2010 | Oh .................... G10L 19/22 704/500 |
| 2011/0000359 A1 | 1/2011 | Yoshida et al. |
| 2011/0103468 A1* | 5/2011 | Polisetty ............ G10L 25/78 375/240.03 |
| 2012/0197650 A1 | 8/2012 | Resch et al. |
| 2016/0065159 A1* | 3/2016 | Yu ...................... H03G 5/165 381/61 |
| 2017/0103769 A1* | 4/2017 | Laaksonen ........ G10L 19/008 |

FOREIGN PATENT DOCUMENTS

| | | |
|---|---|---|
| JP | 2012-10311 A | 1/2012 |
| JP | 2013-509601 A | 3/2013 |
| JP | 2014-520491 A | 8/2014 |
| WO | WO 2007/006856 A1 | 1/2007 |
| WO | 2009/101703 A1 | 8/2009 |

OTHER PUBLICATIONS

International Search Report dated Feb. 21, 2017 in PCT/JP2016/086280 filed Dec. 6, 2016.

* cited by examiner

FIG. 3

```
AudioFrame()
{
    packetType
        switch packetType {
            ::
            case : SpeechTagInformation
                Speech_tag_information() ;
                break;
            case : TagTable
                Tag_table() ;
                break;
            ::
        }
}
```

FIG. 5
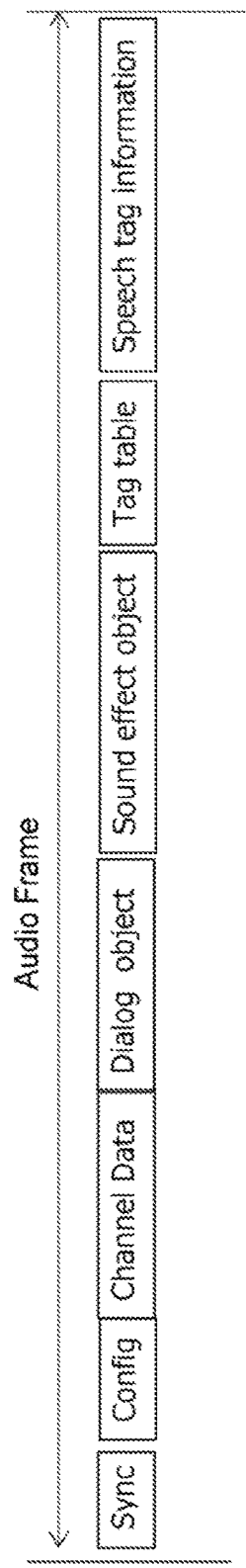
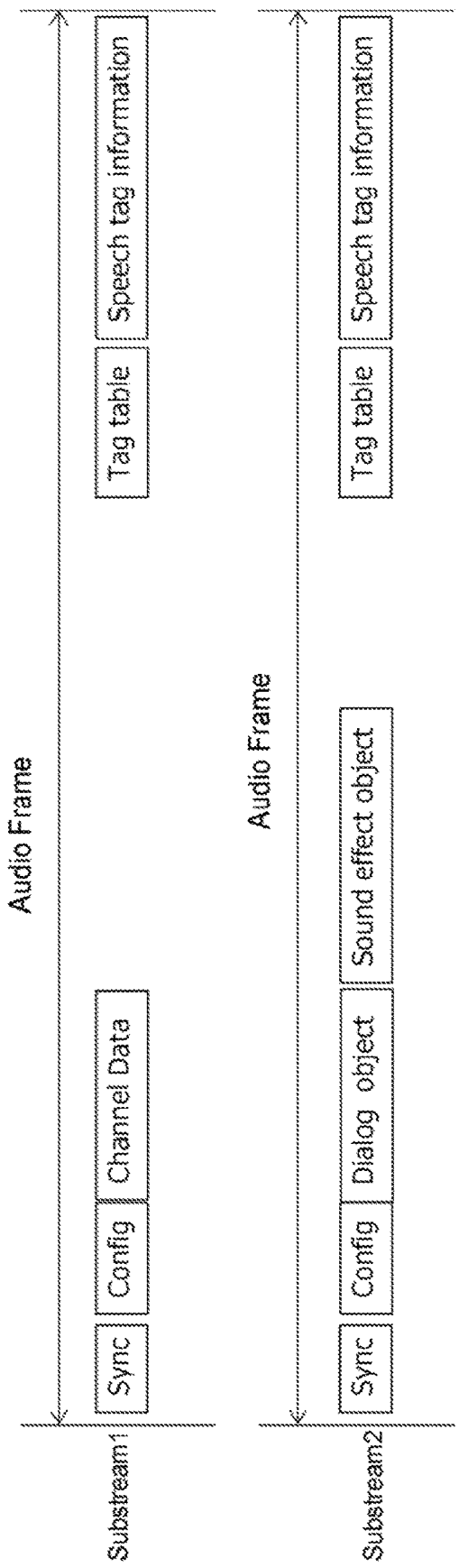

F I G . 7

(a)
```
AudioFrame()
{
        packetType = SpeechTagInformation
        speech_id = 1
        speaker_id = 1
        sted_type = 1  // START
        sample_offset = xs
}
```

(b)
```
AudioFrame()
{
        packetType = SpeechTagInformation
        speech_id = 1
        speaker_id = 1
        sted_type = 3  // CONTINUATION
}
```

(c)
```
AudioFrame()
{
        packetType = SpeechTagInformation
        speech_id = 1
        speaker_id = 1
        sted_type = 2  // END
        sample_offset = xe
}
```

F I G . 9

(a)

Tag Table 1

| SW_group_id = 1 | | |
|---|---|---|
| Group_id = 2 | | |
| Speech_id | Speaker_id | Audio_frame_count |
| 1 | 2 | C1 |
| 2 | 2 | C2 |
| 3 | 1 | C3 |
| 4 | 3 | C4 |

(b)

Tag Table 2

| SW_group_id = 1 | | |
|---|---|---|
| Group_id = 2 | | |
| Speech_id | Speaker_id | Audio_frame_count |
| 5 | 1 | C5 |
| 6 | 3 | C6 |
| 7 | 1 | C7 |
| 8 | 1 | C8 |
| 9 | 2 | C9 |

FIG. 10

Speech_tag_information() syntax

| Syntax | No. of Bits | Format |
|---|---|---|
| Speech_tag_information(){ | | |
|   byte_size | 8 | uimsbf |
|   table_size | 8 | uimsbf |
|   audio_frame_count | 16 | uimsbf |
|   num_of_speeches | 8 | uimsbf |
|   for (i = 0; i < num_of_speeches; i++) { | | |
|     speech_id | 8 | uimsbf |
|     group_id | 8 | uimsbf |
|     sw_group_id | 8 | uimsbf |
|     speaker_id | 8 | uimsbf |
|     sted_type | 2 | bslbf |
|     sample_offset | 14 | uimsbf |
|   } | | |
| } | | |

FIG. 11

Tag_table() syntax

| Syntax | No. of Bits | Format |
|---|---|---|
| Tag_table() { | | |
|   byte_size | 8 | uimsbf |
|   table_size | 8 | uimsbf |
|   group_id | 8 | |
|   switch_goup_id | 8 | uimsbf |
|   num_of_speeches | | |
|   for (i = 0; i < num_of_speeches ; i++) { | 8 | uimsbf |
|     speech_id | 8 | uimsbf |
|     speaker_id | 16 | uimsbf |
|     audio_frame_count | | |
|   } | | |
| } | | |

FIG. 12  Speech_tag_information() / Tag_table() semantics

| Field | Description |
|---|---|
| audio_frame_count (16bits) | A FRAME POSITION FROM A SERVICE HEAD OF AN AUDIO FRAME IS INDICATED BY A FRAME COUNT VALUE. |
| num_of_groups (8bits) | THE NUMBER OF GROUPS IS INDICATED. |
| stream_id (8bits) | IDENTIFICATION INFORMATION OF A STREAM IS INDICATED. |
| num_of_speeches (8bits) | THE NUMBER OF SOUND UNITS IS INDICATED. |
| speech_id (8bits) | SOUND UNIT IDENTIFICATION INFORMATION IS INDICATED. |
| group_id (8bits) | GROUP IDENTIFICATION INFORMATION IS INDICATED. |
| sw_group_id (8bits) | SWITCH GROUP IDENTIFICATION INFORMATION IS INDICATED. |
| num_of_speeches (16bits) | THE NUMBER OF SOUND UNITS IS INDICATED. |
| speaker_id (8bits) | IDENTIFICATION INFORMATION REGARDING A GENERATION SOURCE (SPEAKER) IS INDICATED. |
| sted_type (2bits) | A KIND OF START/END IS INDICATED. |
| "00" | RESERVATION |
| "01" | START |
| "10" | END |
| "11" | CONTINUATION |
| sample_offset (14bits) | AN OFFSET OF A SAMPLE UNIT FROM A FRAME HEAD TO A START POSITION/END POSITION OF A SOUND UNIT IS INDICATED. |

FIG. 13

Tag_table_descriptor() syntax

| Syntax | No. of Bits | Format |
|---|---|---|
| Tag_table_descriptor() { | | |
| Speech_table_descriptor_tag | 8 | uimsbf |
| Speech_table_descriptor_length | 8 | uimsbf |
| num_of_groups | 8 | uimsbf |
| for ( j = 0 ; j < num_of_groups ; j++ ) { | | |
| stream_id | 8 | uimsbf |
| group_id | 8 | uimsbf |
| switch_goup_id | 8 | uimsbf |
| num_of_speeches | 8 | uimsbf |
| for (i = 0; i < num_of_speeches ; i++) { | | |
| speech_id | 8 | uimsbf |
| speaker_id | 8 | uimsbf |
| audio_frame_count | 16 | uimsbf |
| } | | |
| } | | |
| } | | |

EXAMPLE OF BUFFER HOLD CONTENT

```
Unit1
        audio_frame_count
        speech_id
        speaker_id
        AUDIO CONTENT 1  DATA
Unit2
        audio_frame_count
        speech_id
        speaker_id
        AUDIO CONTENT 2  DATA
```

EXAMPLE OF DISPLAY CONTENT

```
Unit1
        audio_frame_count
        speech_id
        speaker_id
Unit2
        audio_frame_count
        speech_id
        speaker_id
```

FIG. 25

```
<MPD>
    <Period>
        <AdaptationSet mimeType="audio/mp4" group="1">
            <SupplementaryDesctiptor schemeIdUri="urn:brdcst:codecType" value="Audio Codec"/>
            <SupplementaryDesctiptor schemeIdUri="urn:brdcst:speechtagContained" value="true"/>
            <Representation id="11" bandwidth="128000">
                <baseURL>audio/jp/128.mp4</BaseURL>
            </Representation>
        </AdaptationSet>
    </Period>
</MPD>
```

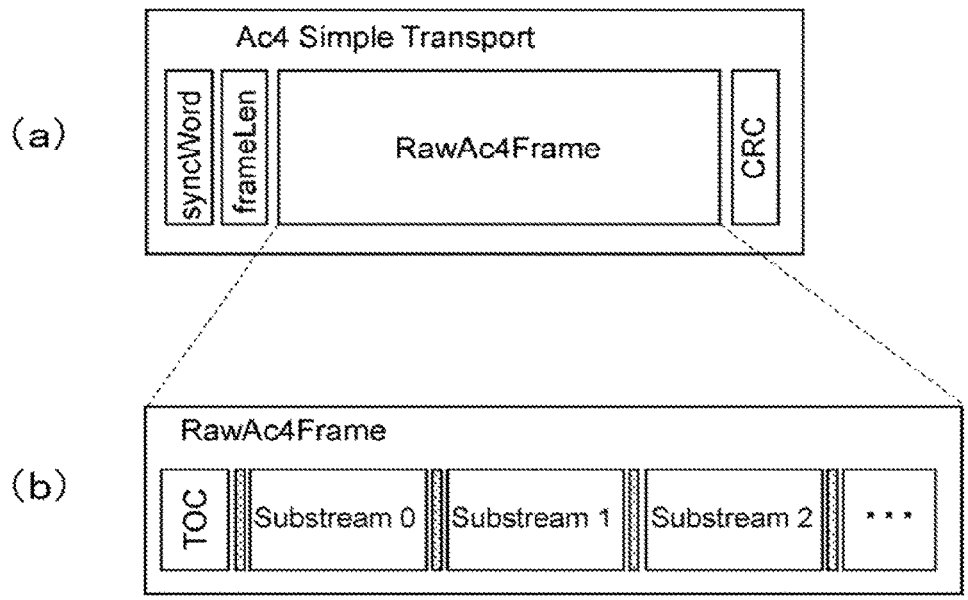

TRANSMITTING APPARATUS, TRANSMITTING METHOD, RECEIVING APPARATUS, AND RECEIVING METHOD

TECHNICAL FIELD

The present technology relates to a transmitting apparatus, a transmitting method, a receiving apparatus, and a receiving method, and more particularly to a transmitting apparatus or the like that transmits an audio stream in a voice-attached distribution service or the like.

BACKGROUND ART

For example, PTL 1 discloses that predetermined information is inserted into an audio compression data stream and is transmitted from a broadcasting station, a distribution server, or the like and processing is performed using the predetermined information on a receiving side.

Further, for example, PTL 2 discloses, as a three-dimensional (3D) sound technology, a 3D audio rendering technology for mapping audio data of an object sound source to a speaker that exists in any location on the basis of its positional information.

CITATION LIST

Patent Literature

[PTL 1]
  JP 2012-010311A
[PTL 2]
  JP 2014-520491A

SUMMARY

Technical Problem

An object of the present technology is to facilitate a process of an audio stream on a receiving side.

Solution to Problem

A concept of the present technology lies in a transmitting apparatus including a stream generating section configured to generate an audio stream in which an audio frame including audio compression data obtained by performing encoding processing on audio data is continuously arranged, an information inserting section configured to insert tag information indicating that the audio compression data of a predetermined sound unit is included into the audio frame including the audio compression data of the predetermined sound unit, and a transmitting section configured to transmit a container stream of a predetermined format including the audio stream into which the tag information is inserted.

In the present technology, encoding processing is performed on audio data and an audio stream in which an audio frame including audio compression data is continuously arranged is generated by the stream generating section. Tag information indicating that the audio compression data of a predetermined sound unit is included is inserted into the audio frame including the audio compression data of the predetermined sound unit by the information inserting section. Here, the sound unit means a cohesiveness corresponding to any time of a sound such as a human voice (voice), a chirp of animals, or an environmental sound. A container stream of a predetermined format including the audio stream into which the tag information is inserted is transmitted by the transmitting section.

For example, the tag information may have type information indicating that a start position of the audio compression data of the predetermined sound unit is included, an end position thereof is included, or neither of the start position and the end position is included. In this case, for example, the tag information may have offset information indicating an offset of a sample unit from a frame head to the start position when the type information indicates that the start position is included and indicating an offset of a sample unit from a frame head to the end position when the type information indicates that the end position is included.

Further, for example, the tag information may have frame count information indicating a frame position from a service head of the audio frame into which the tag information is inserted. Further, for example, when the predetermined sound unit is provided in plurality, the tag information may have sound unit identification information for identifying a corresponding sound unit.

Further, for example, when the predetermined sound unit is provided in plurality and sound units of a plurality of generation sources are included in the plurality of sound units, the tag information may have generation source identification information for identifying the generation source of the corresponding sound unit. Here, in a case in which the sound is a human voice (voice), the generation source means a speaker such as "Mr. A," "Mrs. B," a "man," a "woman," an "adult," or a "child," in a case in which the sound is a chirp of animals, the generation source means a kind of animals or the like such as a "dog" or a "cat," and in a case in which the sound is an environmental sound, the generation source means an environmental sound generating place such as a "construction site," a "concert hall," or a "soccer ground," or an environmental sound itself such as a "sound of waves," a "sound of a typhoon," or "peals of thunder."

Further, for example, the stream generating section may perform encoding processing on the audio data of a plurality of groups and generate the audio stream in which the audio frame including the audio compression data of the plurality of groups is continuously arranged, and the tag information may have group identification information for identifying a group to which the audio compression data of the predetermined sound unit belongs. In this case, for example, when a group indicated by the group identification information is a group constituting a predetermined switch group, the tag information may have switch group identification information for identifying the predetermined switch group.

As described above, in the present technology, the tag information indicating that the audio compression data of a predetermined sound unit is included is inserted into the audio frame including the audio compression data of the predetermined sound unit. Therefore, it is possible to easily segment the audio data corresponding to the predetermined sound unit and use the audio data for a sound output, a caption display, or the like on the basis of the tag information on the receiving side.

It is to be noted that, in the present technology, for example, the information inserting section may further insert table information having information associated with the predetermined sound unit within the audio stream into a layer of the container stream and/or a layer of the audio stream. For example, the information associated with the predetermined sound unit may have the frame count information indicating the frame position from the service head of the audio frame including the audio compression data of the predetermined sound unit.

Further, for example, when the predetermined sound unit is provided in plurality, information associated with the plurality of sound units may have the sound unit identification information for identifying the corresponding sound unit, individually. Further, for example, when the predetermined sound unit is provided in plurality and the sound units of the plurality of generation sources is included in the plurality of sound units, the information associated with the plurality of sound units may have the generation source identification information for identifying the generation source of the corresponding sound unit, individually.

As described above, the table information having information associated with the predetermined sound unit within the audio stream is inserted into a layer of the container stream and/or a layer of the audio stream, and therefore it is possible to perform a process based on the information associated with the predetermined sound unit of the table information on the receiving side. For example, from the storage in which the container stream is written, it is possible to easily perform the reading from a position in which the audio compression data of the predetermined sound unit is included.

In addition, another concept of the present technology lies in a receiving apparatus including a receiving section configured to receive a container stream of a predetermined format including an audio stream in which an audio frame including audio compression data is continuously arranged. The audio frame including the audio compression data of a predetermined sound unit includes tag information indicating that the audio compression data of the predetermined sound unit is included. The receiving apparatus further includes a processing section configured to perform a process of the audio stream by using the tag information.

In the present technology, a container stream of a predetermined format including an audio stream in which an audio frame including audio compression data is continuously arranged is received by the receiving section. The audio frame including the audio compression data of a predetermined sound unit includes tag information indicating that the audio compression data of the predetermined sound unit is included. The process of the audio stream is performed by using the tag information by the processing section.

For example, the processing section may include a decoding section configured to perform decoding processing on the audio compression data included in each audio frame of the audio stream and obtain audio data, and a data segmenting and holding section configured to segment the audio data corresponding to the predetermined sound unit from the audio data obtained by the decoding section and hold the audio data in a buffer on the basis of the tag information. In this case, for example, the processing section may further include a data output section configured to read and output the audio data corresponding to the predetermined sound unit from the buffer on the basis of operational information of a user.

Further, for example, the processing section may include a decoding section configured to perform decoding processing on the audio compression data included in each audio frame of the audio stream and obtain the audio data, and a caption data generating section configured to segment the audio data corresponding to the predetermined sound unit from the audio data obtained by the decoding section, perform a text conversion, and generate caption data on the basis of the tag information.

As described above, in the present technology, the tag information indicating that the audio compression data of a predetermined sound unit is included, which is inserted into the audio frame including the audio compression data of the predetermined sound unit, is used and the process of an audio stream is performed. Therefore, the audio data corresponding to the predetermined sound unit is easily enabled to be segmented and used for a sound output, a caption display, or the like.

In addition, another concept of the present technology lies in a receiving apparatus including a receiving section configured to receive a container stream of a predetermined format including an audio stream in which an audio frame including audio compression data is continuously arranged. The audio frame including the audio compression data of a predetermined sound unit includes tag information indicating that the audio compression data of the predetermined sound unit is included, a layer of the container stream and/or a layer of the audio stream includes table information having information associated with the predetermined sound unit within the audio stream. The receiving apparatus further includes a control section configured to control the received container stream to be written in a storage, the container stream to be read from the storage, the audio stream included in the read container stream to be processed. The control section controls the container stream to be read from the storage on the basis of information associated with the predetermined sound unit of the table information.

In the present technology, a container stream of a predetermined format including an audio stream in which an audio frame including audio compression data is continuously arranged is received by the receiving section. The audio frame including the audio compression data of a predetermined sound unit includes tag information indicating that the audio compression data of the predetermined sound unit is included. Further, a layer of the container stream and/or a layer of the audio stream include table information having information associated with the predetermined sound unit within the audio stream.

The received container stream is controlled to be written in the storage by the control section. For example, the storage is a local storage or an online storage (the storage on a network). In addition, the container stream is controlled to be read from the storage by the control section. In this case, the container stream is controlled on the basis of the information associated with the predetermined sound unit of the table information.

As described above, in the present technology, the container stream is controlled to be read from the storage on the basis of the information associated with the predetermined sound unit of the table information. Therefore, for example, from the storage, it is possible to easily read the container stream in a position in which the audio compression data of the predetermined sound unit is included.

Advantageous Effect of Invention

According to the present technology, it is possible to facilitate a process of an audio stream on the receiving side. It is noted that the effect described in this specification is just an example and does not set any limitation, and there may be additional effects.

BRIEF DESCRIPTION OF DRAWINGS

FIG. 3 is a diagram describing a newly defined packet type.

FIG. 5 is a diagram schematically illustrating a configuration example of the audio frame in a case of transmitting the audio frame in one stream or in multiple streams.

FIG. 7 is a diagram briefly illustrating an example of contents of tag information "Speech_tag_information( )" included in the audio frame.

FIG. 9 is a diagram illustrating an example of contents of table information "Tag Table 1" inserted into the audio stream.

FIG. 10 is a diagram illustrating a structure example of the tag information "Speech_tag_information( )."

FIG. 11 is a diagram illustrating a structure example of the table information "Tag table( )."

FIG. 12 is a diagram illustrating contents of primary information in a structure example of the tag information "Speech_tag_information( )" and in a structure example of the table information "Tag table( )."

FIG. 13 is a diagram illustrating a structure example of a tag table descriptor (Tag_table_descriptor( )).

FIG. 25 is a diagram illustrating an MPD file description example.

FIG. 26 is a diagram illustrating contents of primary information in the MPD file description example.

FIG. 27 is a diagram illustrating a structure of a layer of an AC4 simple transport (Simple Transport).

DESCRIPTION OF EMBODIMENTS

Figure 1:
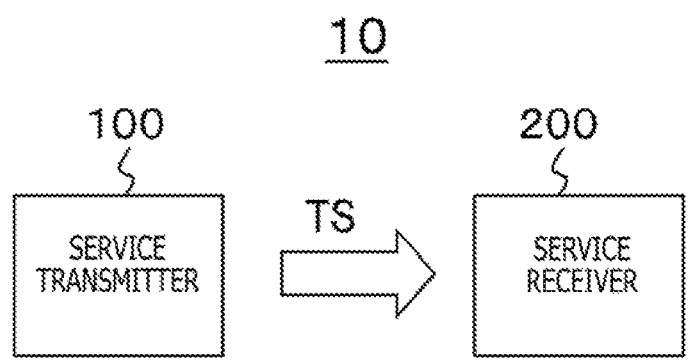
FIG. 1 is a block diagram illustrating a configuration example of a transmitting and receiving system as an embodiment.

In the following, modes (hereinafter, referred to as "embodiments") for carrying out the invention will be described. It is noted that the descriptions will be given in the following order.
1. Embodiment
2. Modified Examples 1. Embodiment Configuration Example of Transmitting and Receiving System FIG. 1 illustrates a configuration example of a transmitting and receiving system 10 as an embodiment. The transmitting and receiving system 10 includes a service transmitter 100 and a service receiver 200. The service transmitter 100 transmits an MPEG-2 transport stream (hereinafter, simply referred to as a "transport stream TS") as a container stream (multiplexed stream) on a broadcast wave or a packet through a network.

The transport stream TS has an audio stream, or a video stream and an audio stream. In the present embodiment, the transport stream TS is assumed to have the video stream and the audio stream. The audio stream is an audio stream in which an audio frame including audio compression data obtained by performing encoding processing on audio data is continuously arranged. In the present embodiment, an encoding method of the audio stream is set to MPEG-H 3D Audio.

The service transmitter 100 inserts tag information indicating that audio compression data of a predetermined sound unit is included into the audio frame including the audio compression data of the predetermined sound unit. Here, the sound unit means a cohesiveness corresponding to any time such as a human voice (voice), a chirp of animals, or an environmental sound. In the present embodiment, the sound unit is assumed to be a cohesiveness corresponding to any time of voices.

The tag information has type information. The type information indicates that a start position of the audio compression data of the predetermined sound unit is included, an end position thereof is included, or neither of the start position and the end position is included. Further, the tag information has offset information indicating an offset of a sample unit from a frame head to the start position when the type information indicates that the start position is included, and also indicating an offset of a sample unit from a frame head to the end position when the type information indicates that the end position is included.

Further, the tag information has frame count information indicating a frame position from the service head of the audio frame into which the tag information is inserted. In addition, when the predetermined sound unit is provided in plurality, the tag information has sound unit identification information for identifying a corresponding sound unit.

In addition, when the predetermined sound unit is provided in plurality and sound units of a plurality of generation sources are included in the plurality of sound units, the tag information has generation source identification information for identifying the generation source of the corresponding sound unit. In the present embodiment, the sound unit is a cohesiveness corresponding to any time of voices and the generation source is a speaker who emits voices, such as "Mr. A," "Mrs. B," a "man," a "woman," an "adult," or a "child."

In addition, when handling the audio compression data of a plurality of groups as the audio compression data, the tag information has group identification information for identifying a group to which the audio compression data of the predetermined sound unit belongs. In addition, when the group identification information belongs to a group constituting a predetermined switch group, the tag information has switch group identification information for identifying the predetermined switch group.

The service transmitter 100 inserts table information having information associated with the predetermined sound unit within the audio stream into a layer of the transport stream TS and/or a layer of the audio stream as the container stream. The information associated with the predetermined sound unit has the frame count information indicating a frame position from the service head of the audio frame including the audio compression data of the predetermined sound unit.

Further, when a predetermined unit is provided in plurality, information associated with the plurality of sound units has the sound unit identification information for identifying the corresponding sound unit, individually. In addition, when the predetermined sound unit is provided in plurality and a plurality of sound units of the plurality of generation sources are included in the plurality of sound units, the information associated with the plurality of sound units has the generation source identification information for identifying the generation source of the corresponding sound unit, individually.

Figure 2:
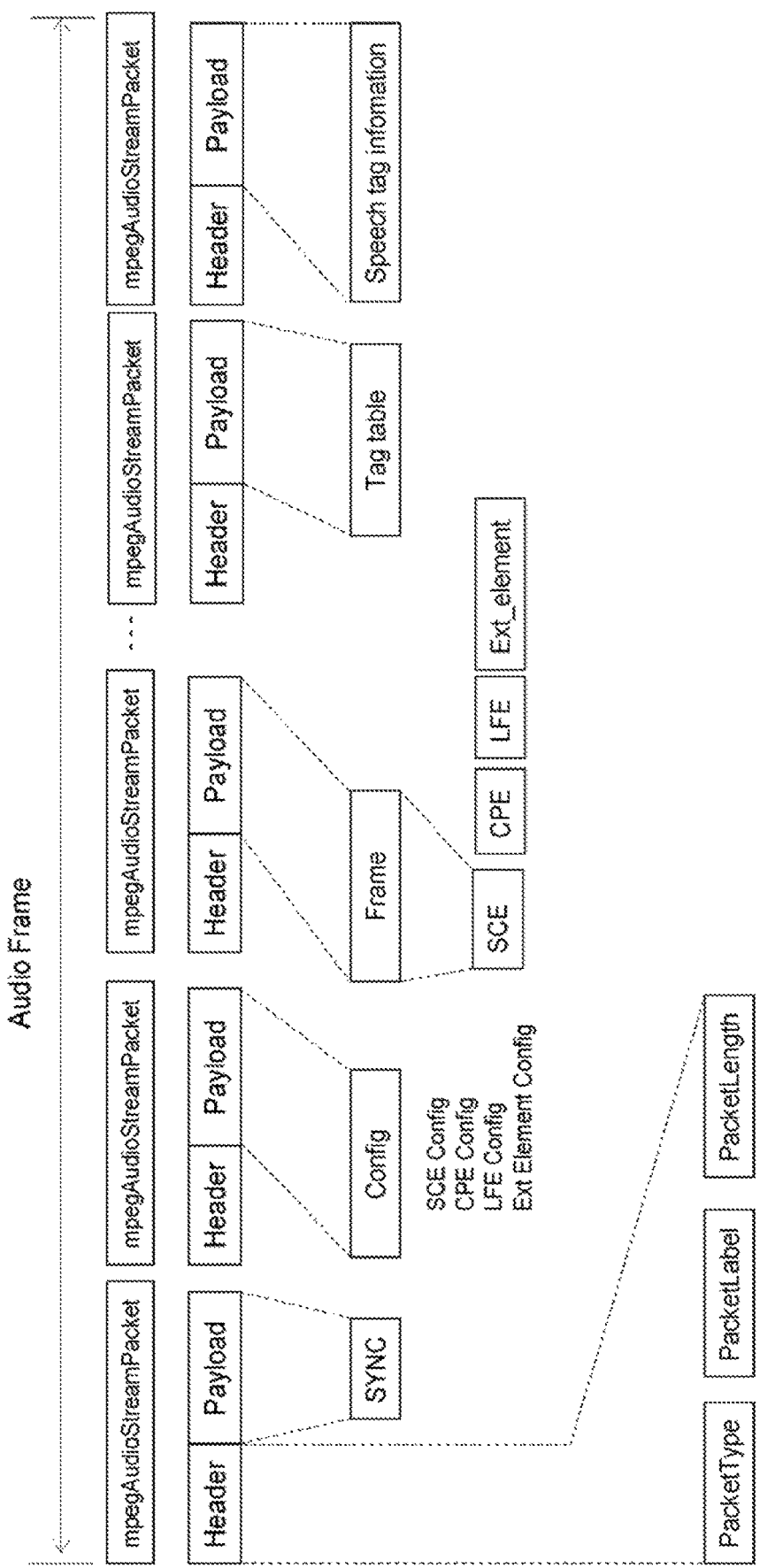
FIG. 2 is a diagram illustrating a structure example of an audio frame in transport data of MPEG-H 3D Audio.

FIG. 2 illustrates a structure example of an audio frame in transport data of MPEG-H 3D Audio. The audio frame includes a plurality of MPEG audio stream packets (mpeg Audio Stream Packet). Each of the MPEG audio stream packets includes a header (Header) and a payload (Payload).

The header includes information such as a packet type (Packet Type), a packet label (Packet Label), and a packet length (Packet Length). Information defined in the packet type of the header is assigned in the payload. The payload information includes "SYNC" corresponding to a synchronization start code, "Frame" serving as actual data of 3D audio transport data, and "Config" indicating a configuration of the "Frame."

The "Frame" includes channel coded data and object coded data constituting 3D audio transport data. Here, the channel coded data includes coded sample data such as an SCE (Single Channel Element), a CPE (Channel Pair Element), and an LFE (Low Frequency Element). In addition, the object coded data includes the coded sample data of the SCE (Single Channel Element) and metadata for mapping and rendering the coded sample data to a speaker that is in any position. The metadata is included as an extension element (Ext_element).

Further, the payload information is newly defined in the present embodiment. "Tag table" and "Speech tag information" are provided in the payload information. In the "Speech tag information," the above-described tag information "Speech_tag_information( )" is included and in the "Tag table," the above-described table information "Tag_table( )" is included. FIG. 3 illustrates that "SpeechTagInformation" for including the tag information "Speech_tag_information( )" and "TagTable" for including the table information "Tag_table( )" are newly defined as a packet type.

Figure 4:
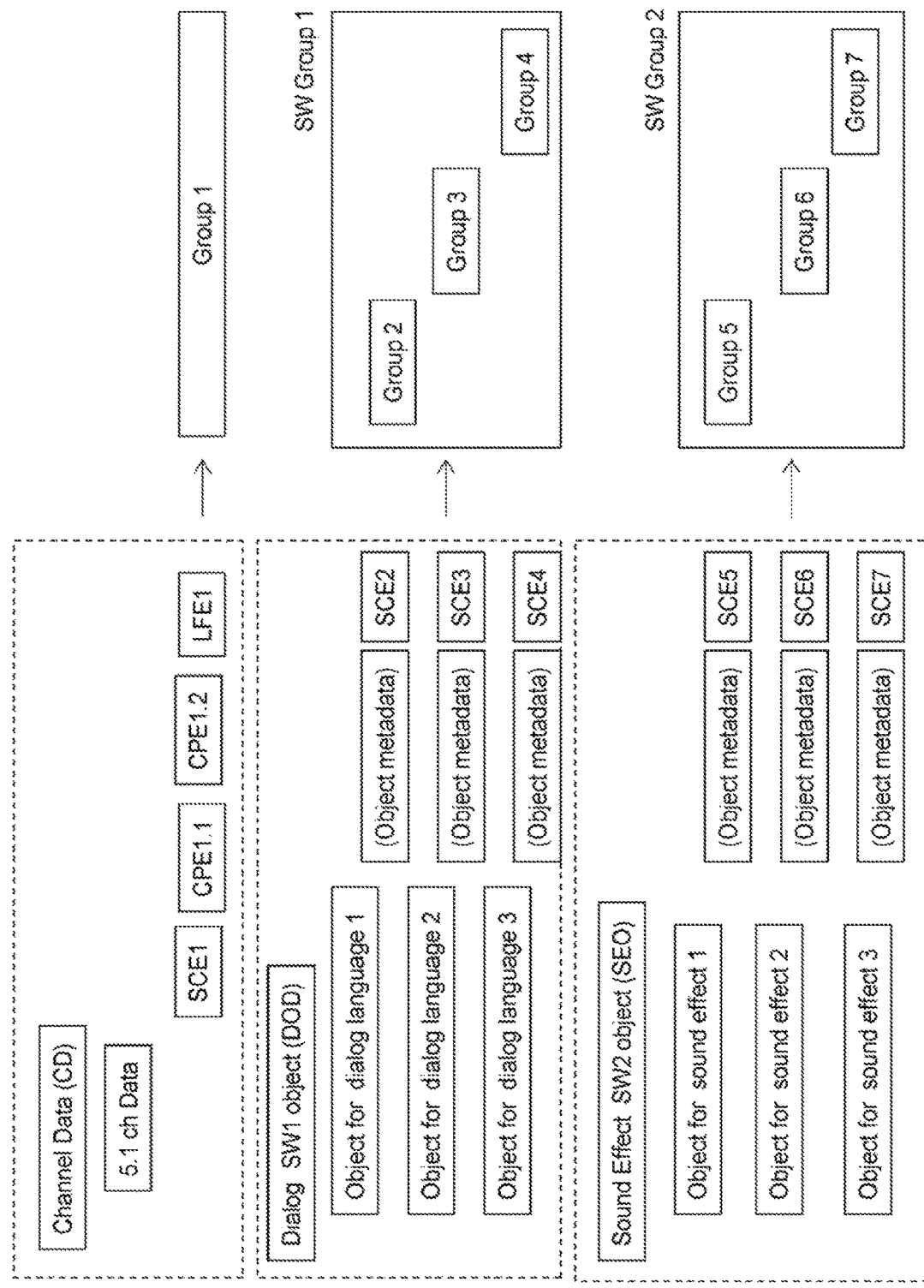
FIG. 4 is a diagram illustrating a configuration example of the transport data of MPEG-H 3D Audio.

FIG. 4 illustrates a configuration example of transport data of MPEG-H 3D Audio. The configuration example includes one piece of channel coded data and six pieces of object coded data. One piece of channel coded data is channel coded data (CD) of 5.1 channel and includes each piece of coded sample data of SCE1, CPE1.1, CPE1.2, and LFE1.

Among the six pieces of object coded data, first three pieces of object coded data belong to coded data (DOD) of a content group of a dialog language object. The three pieces of object coded data are coded data of the dialog language object corresponding to respective first, second, and third languages.

The coded data of the dialog language object corresponding to the first, second, and third languages individually includes coded sample data SCE2, SCE3, and SCE4 and metadata (Object metadata) for mapping and rendering the coded sample data to a speaker that is present in any position.

In addition, among the six pieces of object coded data, the remaining three pieces of object coded data belong to coded data (SEO) of a content group of a sound effect object. The three pieces of object coded data are coded data of a sound effect object (Object for sound effect) corresponding to respective first, second, and third sound effects.

The coded data of the sound effect object corresponding to the first, second, and third sound effects individually includes coded sample data SCE5, SCE6, and SCE7 and metadata (Object metadata) for mapping and rendering the coded sample data to a speaker that is present in any position.

The coded data is classified by a concept of a group (Group) for each category. In this configuration example, channel coded data of 5.1 channel is classified as a group 1 (Group 1). In addition, coded data of the dialog language object corresponding to the first, second, and third languages is classified as a group 2 (Group 2), a group 3 (Group 3), and a group 4 (Group 4), individually. In addition, coded data of the sound effect object corresponding to the first, second, and third sound effects is classified as a group 5 (Group 5), a group 6 (Group 6), and a group 7 (Group 7), individually.

In addition, data that can be selected among groups on a receiving side is registered in a switch group (SW Group) and coded. In this configuration example, the group 2, group 3, and group 4 belonging to the content group of the dialog language object are classified as a switch group 1 (SW Group 1). Further, the group 5, group 6, and group 7 belonging to the content group of the sound effect object are classified as a switch group 2 (SW Group 2).

Referring back to FIG. 1, the service transmitter 100 transmits transport data of 3D audio including coded data of plural groups as described above in one stream (Single stream) or in multiple streams (Multiple stream), for example, in two streams.

FIG. 5(a) schematically illustrates a configuration example of an audio frame in a case in which transmission is performed in one stream in the configuration example of the transport data of 3D audio of FIG. 4. In this case, the one stream includes the channel coded data (CD), the coded data of the dialog language object (DOD), and the coded data of the sound effect object (SEO), and in addition, the tag information "Speech tag information( )" and the table information "Tag table( )" along with "SYNC" information and "Config" information.

Note that the tag information "Speech tag information( )" and the table information "Tag table( )" are not limited to be included in all the audio frames. The tag information "Speech tag information( )" is included in the audio frame including the audio compression data of the predetermined sound unit. Further, the table information "Tag table( )" is inserted into any audio frame. The above fact is similarly applied to even a case in which transmission is performed in the following multiple streams.

In the configuration example of the transport data of 3D audio of FIG. 4, FIG. 5(b) schematically illustrates a configuration example of an audio frame in a case in which transmission is performed in multiple streams (each stream is assumed to be arbitrarily referred to as a "substream"), here, in two streams. In this case, the substream 1 includes the channel coded data (CD) and further the tag information "Speech tag information( )" and the table information "Tag table( )" along with the "SYNC" information and the "Config" information.

Further, the substream 2 includes the coded data (DOD) of the dialog language object and the coded data (SEO) of the sound effect object and further the tag information "Speech tag information( )" and the table information "Tag table( )" along with the "SYNC" information and the "Config" information.

Note that in the example of FIG. 5(b), both of the substreams 1 and 2 include the tag information "Speech tag information( )" and the table information "Tag table( )," however, in a case of multiple streams, any one or more of the substreams include the tag information "Speech tag information( )" and the table information "Tag table( )" to thereby perform a simple control management.

Figure 6:
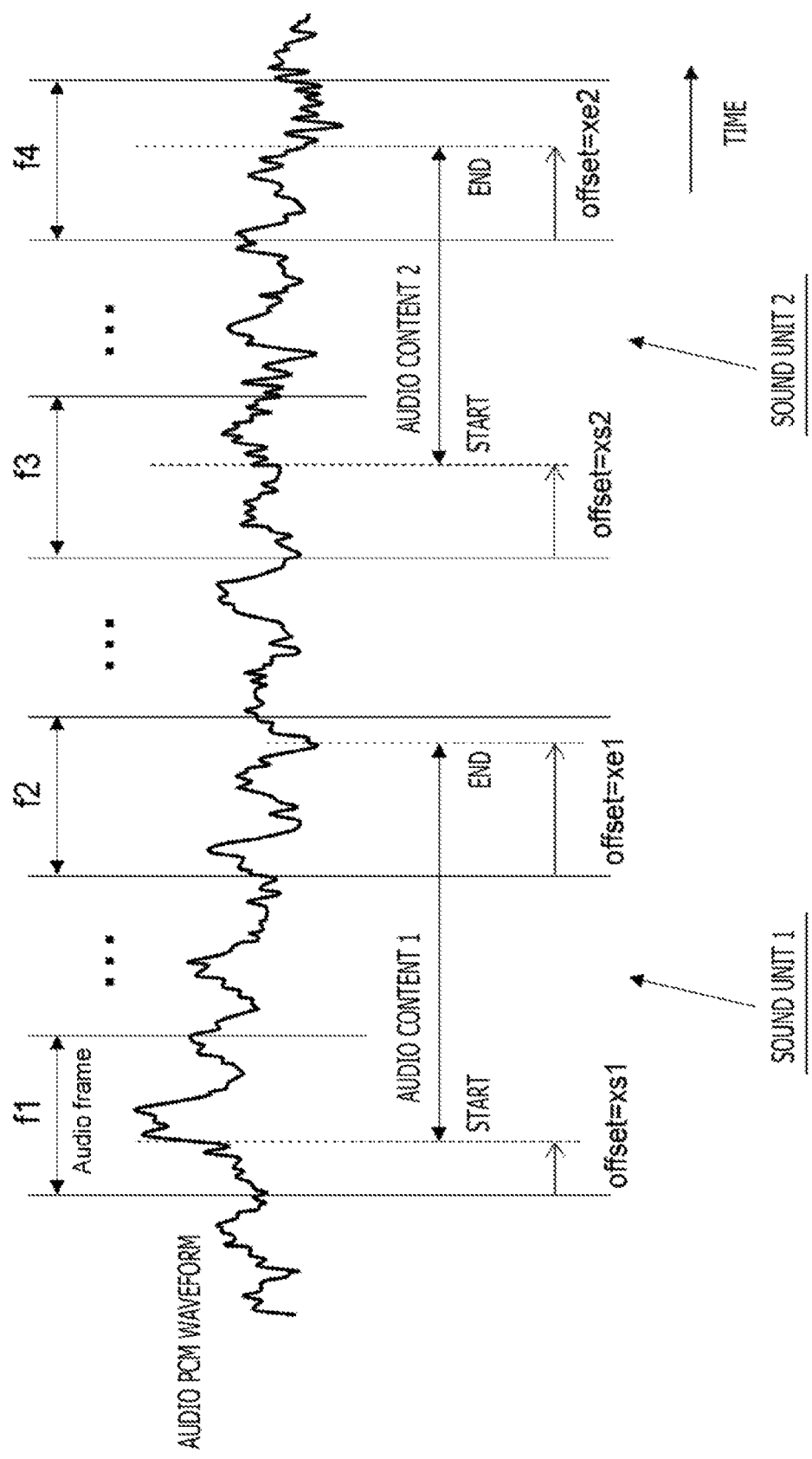
FIG. 6 is a diagram illustrating an example of a correspondence relationship between an audio stream in which the audio frame including audio compression data is continuously arranged and a sound unit.

FIG. 6 illustrates an example of a correspondence relationship between the audio stream in which the audio frame including the audio compression data is continuously arranged and the sound unit. In this example, a sound unit 1 having an audio content 1 and a sound unit 2 having an audio content 2 are present.

In the sound unit 1, a start position is present in an audio frame f1 and an end position is present in an audio frame f2. An offset of a sample unit from a frame head to the start position of the audio frame f1 is "xs1" and an offset of a sample unit from a frame head to the end position of the audio frame f2 is "xe1." Further, in the sound unit 2, a start position is present in an audio frame f3 and an end position is present in an audio frame f4. An offset of a sample unit from a frame head to the start position of the audio frame f3 is "xs2" and an offset of a sample unit from a frame head to the end position of the audio frame f4 is "xe2."

FIG. 7 simply illustrates an example of contents of the tag information "Speech_tag_information( )" included in the audio frame (Audio Frame). Note that in this example, the frame count information, the group identification information, the switch group identification information, or the like is omitted.

FIG. 7(a) illustrates an example of an audio frame (refer to the audio frames f1 and f3 of FIG. 6) including a start position of a sound unit. In this case, information such as the sound unit identification information "speech_id," the generation source identification information "speaker_id," the type information "sted_type," and the offset information "sample_offset" is present.

An expression "speech_id=1" indicates that the identification information of the corresponding sound unit is "1." An expression "speaker_id=1" indicates that the identification information of the generation source (speaker) of the corresponding sound unit is "1." An expression "sted_type=1" indicates that the type information is "1," that is, the start position of the sound unit is included. Then, an expression "sample_offset=xs" indicates that an offset of a sample unit from a frame head to the start position is "xs."

FIG. 7(b) illustrates an example of an audio frame (refer to audio frames positioning from the next audio frame of the audio frame f1 to the previous audio frame of the audio frame f2 and audio frames positioning from the next audio frame of the audio frame f3 to the previous audio frame of the audio frame f4 of FIG. 6) including neither of a start position and an end position of a sound unit. In this case, information such as the sound unit identification information "speech_id," the generation source identification information "speaker_id," and the type information "sted_type" is present.

The expression "speech_id=1" indicates that the identification information of the corresponding sound unit is "1." The expression "speaker_id=1" indicates that the identification information of the generation source (speaker) of the corresponding sound unit is "1." An expression "sted_type=3" indicates that the type information is "3," that is, a continuation state in which neither of the start position and the end position of the sound unit is included.

FIG. 7(c) illustrates an example of an audio frame (refer to the audio frames f2 and f4 of FIG. 6) including an end position of a sound unit. In this case, information such as the sound unit identification information "speech_id," the generation source identification information "speaker_id," the type information "sted_type," and the offset information "sample_offset" is present.

The expression "speech_id=1" indicates that the identification information of the corresponding sound unit is "1." The expression "speaker_id=1" indicates that the identification information of the generation source (speaker) of the corresponding sound unit is "1." An expression "sted_type=2" indicates that the type information is "2," that is, the end position of the sound unit is included. Further, an expression "sample_offset=xe" indicates that an offset of a sample unit from a frame head to the end position is "xe."

Figure 8:
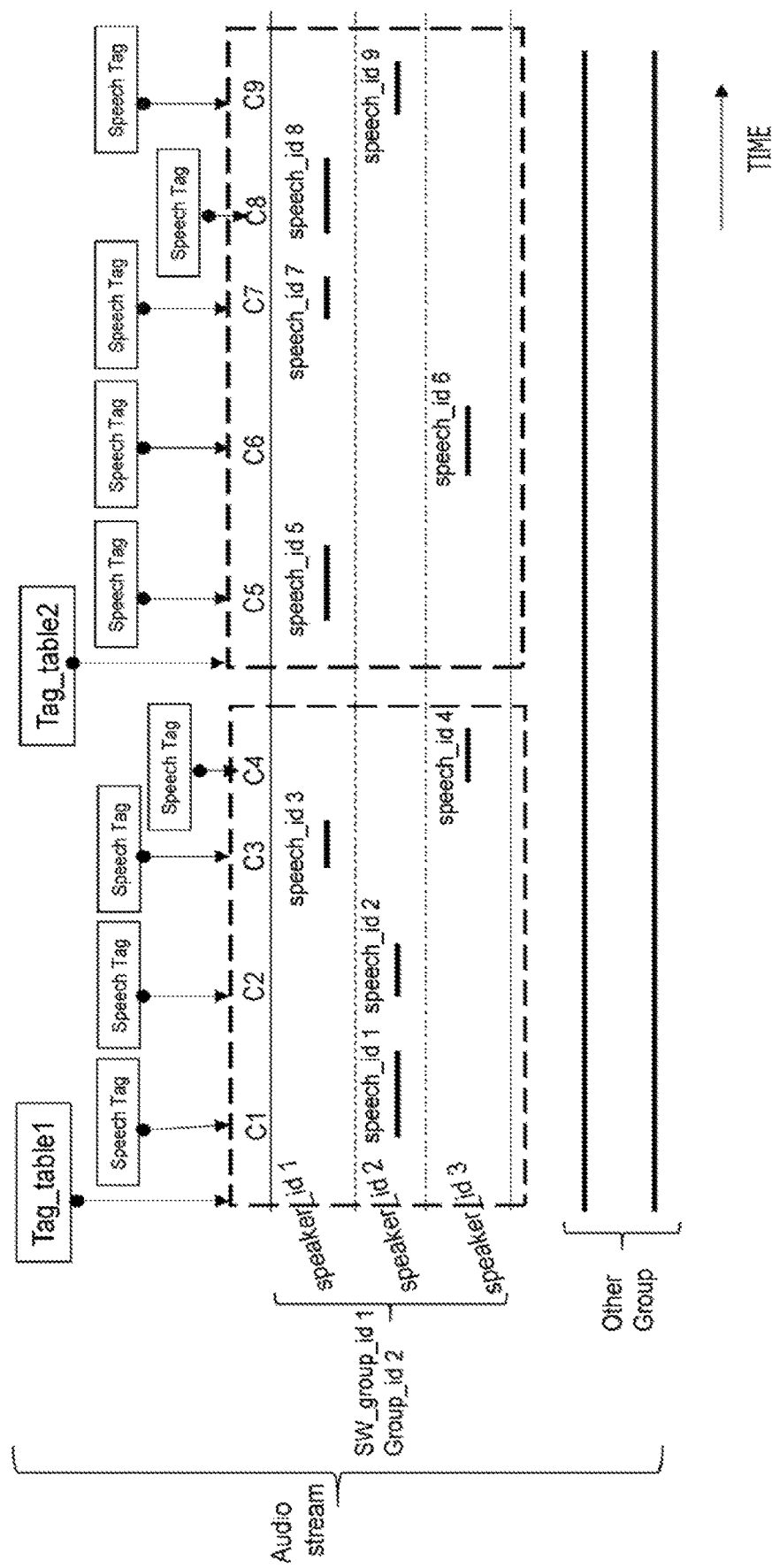
FIG. 8 is a diagram illustrating an example of an insertion of the tag information "Speech_tag_information( )" into the audio stream and an insertion of table information "Tag_table( )" thereinto.

FIG. 8 illustrates an example of an insertion of the tag information "Speech_tag_information( )" into an audio stream and that of the table information "Tag_table( )" into the audio stream. This example indicates a case in which the group 2 (Group_id=2) of the switch group 1 (SW_group_id=1) is noticed and a speaker 1 (speaker_id=1), a speaker 2 (speaker_id=2), and a speaker 3 (speaker_id=3) exist as a generation source (speaker) of a sound unit.

The tag information "Speech_tag_information( )" of four sound units is inserted into the audio stream in frame positions of C1, C2, C3, and C4. The tag information of respective sound units is normally inserted into plural frames. The frame positions C1, C2, C3, and C4 indicate frame counts indicating the frame position from a service head of an audio frame including a start position.

The tag information inserted in the frame position of C1 corresponds to the sound unit (speech_id=1) related to a voice of the speaker 2 (speaker_id=2). The tag information inserted in the frame position of C2 corresponds to the sound unit (speech_id=2) related to a voice of the speaker 2 (speaker_id=2). The tag information inserted in the frame position of C3 corresponds to the sound unit (speech_id=3) related to a voice of the speaker 1 (speaker_id=1). The tag information inserted in the frame position of C4 corresponds to the sound unit (speech_id=4) related to a voice of the speaker 3 (speaker_id=3).

Table information "Tag Table 1" having information associated with the four sound units inserted in the frame positions of C1, C2, C3, and C4 is inserted into the audio stream in frame positions before the frame positions of C1, C2, C3, and C4. FIG. 9(a) illustrates an example of contents of the table information "Tag Table 1." The sound unit information "Speech_id," the generation source identification information "Speaker_id," and the frame count information "Audio_frame_count" are present for each sound unit in addition to the switch group identification information "SW_group_id" and group identification information "Group_id" common to each sound unit.

Further, the tag information "Speech_tag_information( )" of five sound units is inserted into the audio stream in frame positions of C5, C6, C7, C8, and C9. The tag information of respective sound units is normally inserted into plural frames. The frame positions of C5, C6, C7, C8, and C9 indicate frame count values indicating the frame position from a service head of an audio frame including a start position.

The tag information inserted in the frame position of C5 corresponds to a sound unit (speech_id=5) related to a voice of the speaker 1 (speaker_id=1). The tag information inserted in the frame position of C6 corresponds to a sound unit (speech_id=6) related to a voice of the speaker 3 (speaker_id=3). The tag information inserted in the frame position of C7 corresponds to a sound unit (speech_id=7) related to a voice of the speaker 1 (speaker_id=1). The tag information inserted in the frame position of C8 corresponds to a sound unit (speech_id=8) related to a voice of the speaker 1 (speaker_id=1). The tag information inserted in the frame position of C9 corresponds to a sound unit (speech_id=9) related to a voice of the speaker 2 (speaker_id=2).

Table information "Tag Table 2" having information associated with the five sound units inserted in the frame positions of C5, C6, C7, C8, and C9 is inserted into the audio stream in frame positions before the frame positions of C5, C6, C7, C8, and C9. FIG. 9(b) illustrates an example of contents of the table information "Tag Table 2." The sound unit information "Speech_id," the generation source identification information "Speaker_id," and the frame count information "Audio_frame_count" are present for each sound unit in addition to the switch group identification information "SW_group_id" and group identification information "Group_id" common to each sound unit.

FIG. 10 illustrates a structure example (syntax) of the tag information "Speech_tag_information( )." FIG. 11 illustrates a structure example (syntax) of the table information "Tag table( )." FIG. 12 illustrates contents (semantics) of primary information in their structure examples.

First, the structure example of the tag information "Speech_tag_information( )" will be described. A 16-bit field of "audio_frame_count" indicates, by the frame count value, the frame position from the service head of the audio frame into which the tag information is inserted. An 8-bit field of "num_of_speeches" indicates the number of the sound units. Respective fields of an 8-bit field of "speech_id," an 8-bit field of "group_id," an 8-bit field of "sw_group_id," an 8-bit field of "speaker_id," a 2-bit field of "sted_type," and a 14-bit field of "sample_offset" are repeatedly provided to correspond to the number of the sound units.

The field of "speech_id" indicates the sound unit identification information. The field of "group_id" indicates the group identification information. The field of "sw_group_id" indicates the switch group identification information. The field of "speaker_id" indicates the generation source (speaker) identification information. The field of "sted_type" indicates that the start position of the sound unit is included, the end position thereof is included, or neither of the start position and the end position is included (continuation). For example, "01" indicates that the start position is included, "10" indicates that the end position is included, and "11" indicates that neither of the start position and the end position is included (continuation).

The field of "sample_offset" indicates an offset of a sample unit from the frame head to the start position/end position. When "sted_type" is "01," the field of "sample_offset" indicates an offset of a sample unit from the frame head to the start position and, when "sted_type" is "10," indicates an offset of a sample unit from the frame head to the end position.

Next, the structure example of the table information "Tag_table( )" will be described. An 8-bit field of "group_id" indicates the group identification information. An 8-bit field of "sw_group_id" indicates the switch group identification information. An 8-bit field of "num_of_speeches" indicates the number of the sound units. Respective fields of an 8-bit field of "speech_id," an 8-bit field of "speaker_id," and a 16-bit field of "audio_frame_count" are repeatedly provided to correspond to the number of the sound units.

The field of "speech_id" indicates the sound unit identification information. The field of "speaker_id" indicates the generation source (speaker) identification information. The frame position from the service head of the audio frame in which the start position of the sound unit is included is indicated by the frame count value.

FIG. 13 illustrates a structure example (syntax) of a tag table descriptor (Tag_table_descriptor( )) for inserting information similar to the above-described table information "Tag_table( )" into the container stream. An 8-bit field of "descriptor_tag" indicates a descriptor type. Here, the 8-bit field of "descriptor_tag" indicates the tag table descriptor. An 8-bit field of "descriptor_length" indicates a length (a size) of a descriptor and the length of the descriptor indicates the following number of bytes.

An 8-bit field of "num_of_groups" indicates the number of groups. The following factors are repeatedly provided to correspond to the number of groups. An 8-bit field of "stream_id" is used for identifying an audio stream in a case in which the audio stream includes multiple streams. It is possible to specify the transport stream by using the information and a streamID indicated by "MPEG-H 3D Audio Multi-Stream Descriptor." The field of "group_id" indicates the group identification information. The field of "sw_group_id" indicates the switch group identification information. The 8-bit field of "num_of_speeches" indicates the number of the sound units. Respective fields of an 8-bit field of "speech_id," an 8-bit field of "speaker_id," and a 16-bit field of "audio_frame_count" are repeatedly provided to correspond to the number of the sound units. Note that contents of information associated with respective fields are similar to those of descriptions of the above-described table information "Tag_table( )" (refer to FIG. 11).

Referring back to FIG. 1, the service receiver 200 receives the above-described transport stream TS transmitted from the service transmitter 100 on a broadcast wave or on a packet through a network. The transport stream TS includes an audio stream in addition to a video stream. The audio stream is an audio stream in which an audio frame including audio compression data obtained by performing encoding processing on audio data is continuously arranged.

As described above, the tag information (refer to FIG. 10) indicating that the audio compression data of the predetermined sound unit is included is inserted into the audio frame including the audio compression data of the predetermined sound unit. Further, as described above, the table information (refer to FIG. 11 and FIG. 13) having information associated with the predetermined sound unit within the audio stream is inserted into a layer of the transport stream TS and/or a layer of the audio stream.

The service receiver 200 performs a process of the audio stream by using the tag information. For example, the service receiver 200 obtains the audio data by performing decoding processing on the audio compression data included in respective audio frames of the audio stream; further, on the basis of the tag information, the service receiver 200 segments audio data corresponding to the predetermined sound unit from the audio data and holds the audio data in a buffer. Then, on the basis of operational information of a user, the service receiver 200 reads the audio data corresponding to the predetermined sound unit from the buffer and outputs the audio data as a sound or performs a text conversion to display the audio data as a caption.

Further, for example, the service receiver 200 performs decoding processing on the audio compression data included in respective audio frames of the audio stream and obtains the audio data; further, on the basis of the tag information, the service receiver 200 segments audio data corresponding to the predetermined sound unit from the audio data, performs the text conversion, generates caption data, and performs a caption display.

Further, the service receiver 200 writes the transport stream TS in a local storage or an online storage and then reads the transport stream TS from the storage to perform a process of the audio stream included in the transport stream TS. On the basis of the information associated with the predetermined sound unit included in the table information, the service receiver 200 can control the transport stream TS to be read from the storage. For example, the service receiver 200 can control the container stream to be read from a frame position in which the sound unit according to user selection is included.

[Stream Generating Section of Service Transmitter]

Figure 14:
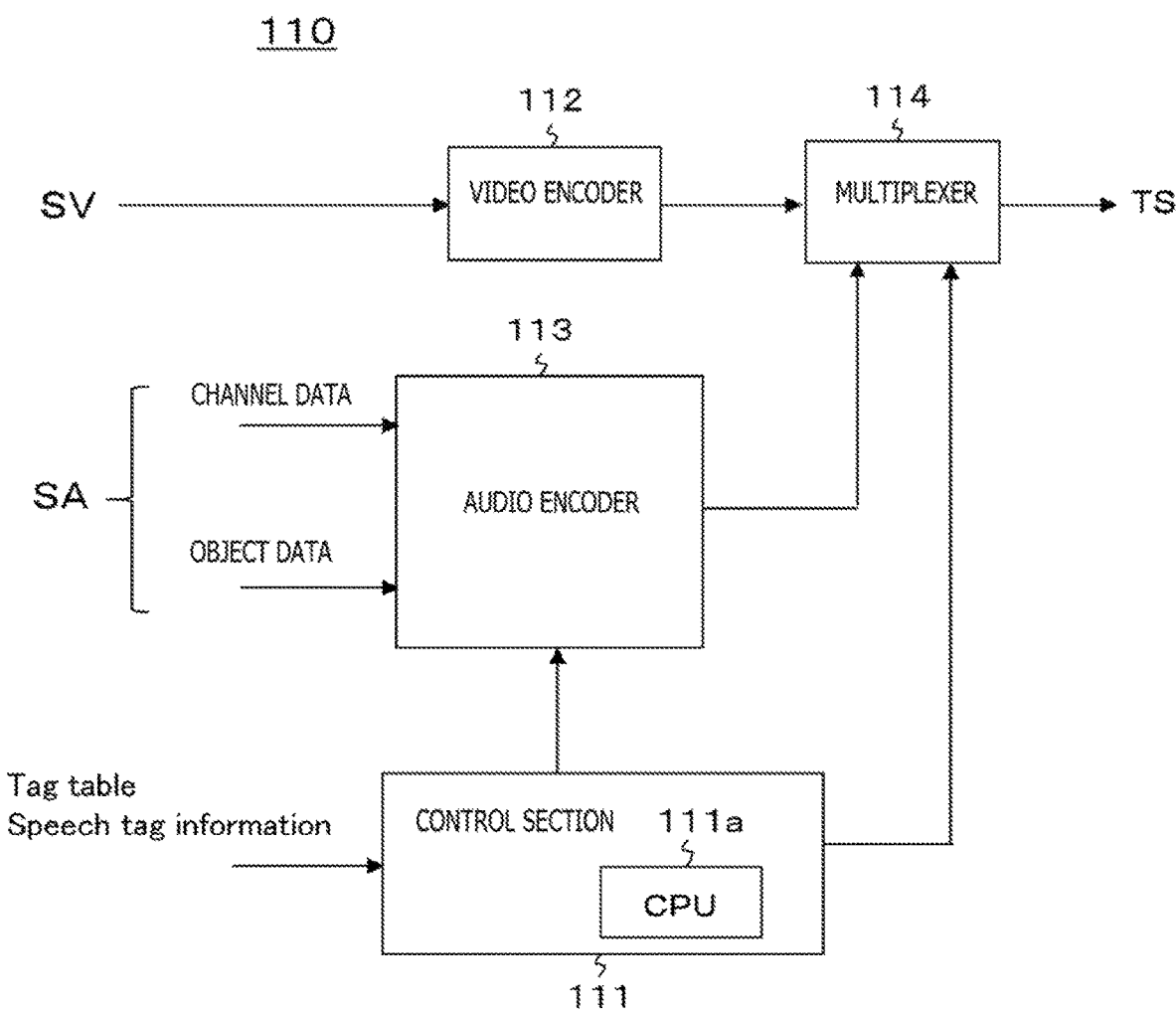
FIG. 14 is a block diagram illustrating a configuration example of a stream generating section included in a service transmitter 100.

FIG. 14 illustrates a configuration example of a stream generating section 110 included in the service transmitter 100. The stream generating section 110 includes a control section 111, a video encoder 112, an audio encoder 113, and a multiplexer 114.

The video encoder 112 inputs video data SV, codes the video data SV, and generates a video stream (a video elementary stream). The audio encoder 113 inputs object data of a predetermined number of content groups in addition to channel data as audio data SA. One or a plurality of pieces of object content belong to each content group.

The audio encoder 113 codes the audio data SA, obtains 3D audio transport data, and generates an audio stream (an audio elementary stream) including the 3D audio transport data. The 3D audio transport data includes object coded data of a predetermined number of content groups in addition to channel coded data.

For example, as illustrated in the configuration example of FIG. 4, channel coded data (CD), coded data (DOD) of a content group of a dialog language object, and coded data (SEO) of a content group of a sound effect object are included.

Under the control of the control section 111, the audio encoder 113 inserts the tag information "Speech_tag_information( )" (refer to FIG. 10) indicating that the audio compression data of the predetermined sound unit is included into the audio frame including the audio compression data of the predetermined sound unit. Further, under the control of the control section 111, the audio encoder 113 inserts the table information "Tag_table( )" (refer to FIG. 11) having information associated with the predetermined sound unit within the audio stream into any audio frame.

The multiplexer 114 individually PES-packetizes the video stream output from the video encoder 112 and a predetermined number of audio streams output from the audio encoder 113, additionally transport-packetizes and multiplexes the stream, and obtains a transport stream TS as the container stream (the multiplexed stream).

Under the control of the control section 111, the multiplexer 114 inserts table information similar to the above-described table information "Tag_table( )" (refer to FIG. 11) having information associated with the predetermined sound unit within the audio stream into the transport stream TS. In the present embodiment, the multiplexer 114 inserts the tag table descriptor (Tag_table_descriptor( )) (refer to FIG. 13) into an audio elementary stream loop that is provided under a PMT (Program Map Table).

Operations of the stream generating section 110 illustrated in FIG. 14 will be briefly described. The video data SV is supplied to the video encoder 112. In the video encoder 112, the video data SV is coded and a video stream including the coded video data is generated. The video stream is supplied to the multiplexer 114.

The audio data SA is supplied to the audio encoder 113. The audio data SA includes object data of a predetermined number of content groups in addition to channel data. Here, one or a plurality of pieces of object content belong to each content group.

In the audio encoder 113, the audio data SA is coded and 3D audio transport data is obtained. The 3D audio transport data includes the object coded data of a predetermined number of content groups in addition to the channel coded data. Therefore, in the audio encoder 113, an audio stream including the 3D audio transport data is generated.

At this time, under the control of the control section 111, the audio encoder 113 inserts the tag information "Speech_tag_information( )" indicating that the audio compression data of the predetermined sound unit is included into the audio frame including the audio compression data of the predetermined sound unit. Further, under the control of the control section 111, the audio decoder 113 inserts the table information "Tag_table( )" having information associated with the predetermined sound unit within the audio stream into any audio frame.

The video stream generated in the video encoder 112 is supplied to the multiplexer 114. In addition, the audio stream generated in the audio encoder 113 is supplied to the multiplexer 114. The multiplexer 114 PES-packetizes a stream supplied from each encoder, additionally transport-packetizes and multiplexes the stream, and obtains a transport stream TS.

At this time, under the control of the control section 111, the multiplexer 114 inserts the table information having information associated with the predetermined sound unit within the audio stream into the transport stream TS. In this case, the tag table descriptor (Tag_table_descriptor( )) is inserted into the audio elementary stream loop that is provided under the PMT.

[Configuration of Transport Stream TS]

Figure 15:
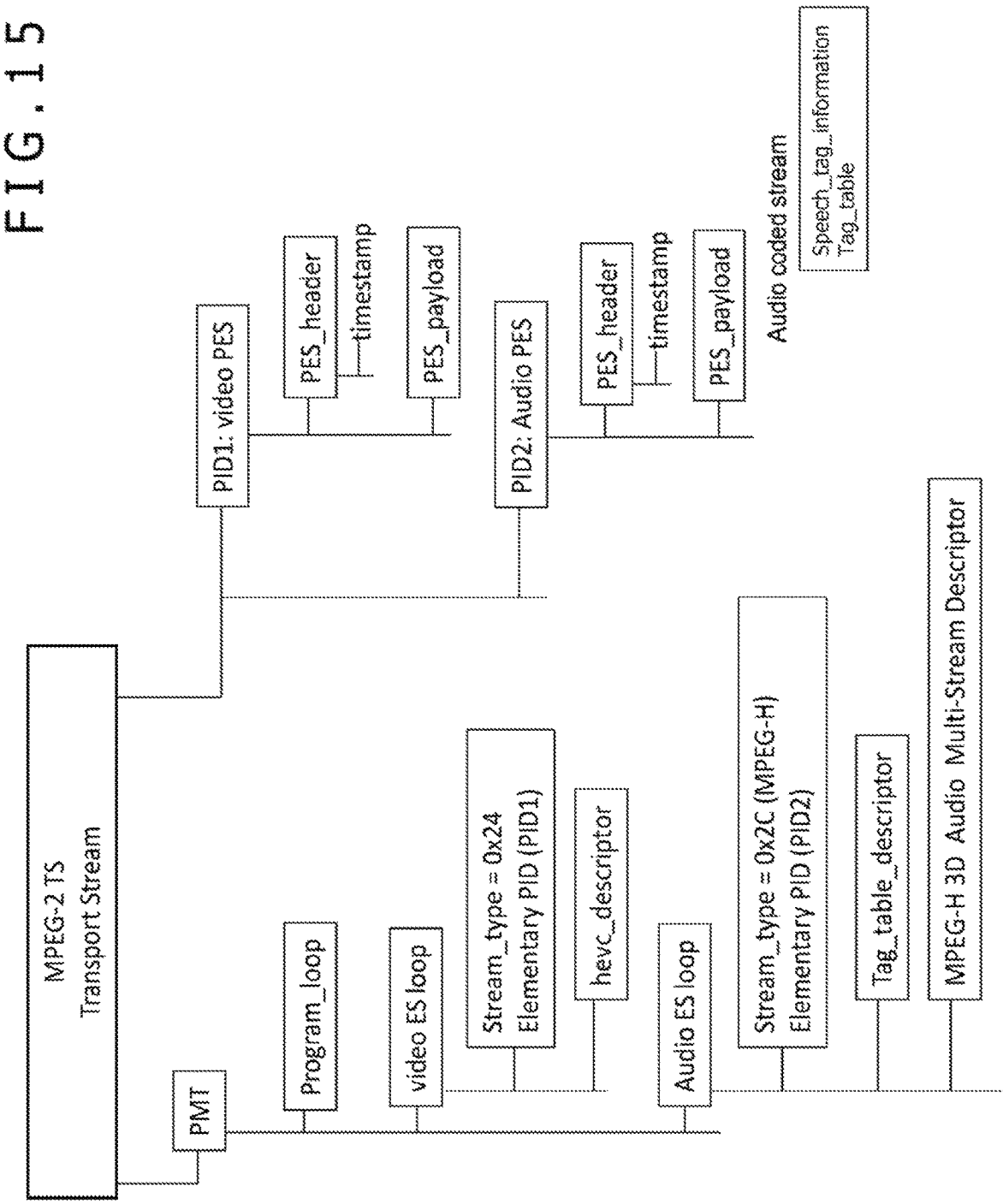
FIG. 15 is a diagram illustrating a configuration example of a transport stream TS in a case in which transport data of 3D audio is transmitted in one stream.

FIG. 15 illustrates a configuration example of the transport stream TS in a case in which the 3D audio transport data is transmitted by one stream (refer to FIG. 5(a)). The configuration example includes a PES packet "video PES" of a video stream that is identified as a PID1 and a PES packet "audio PES" of an audio stream that is identified as a PID2. The PES packet includes a PES header (PES_header) and a PES payload (PES_payload). Timestamps of DTS and PTS are inserted into the PES header.

An audio stream (Audio coded stream) is inserted into the PES payload of the PES packet of the audio stream. The tag information "Speech_tag_information( )" is inserted into the audio stream and also the table information "Tag_table( )" is inserted thereinto.

In addition, in the transport stream TS, the PMT (Program Map Table) is included as PSI (Program Specific Information). The PSI is information that describes a program to which each elementary stream included in the transport stream belongs. The PMT includes a program loop (Program loop) that describes information associated with the entire program.

In addition, the PMT includes an elementary stream loop having information associated with each elementary stream. The configuration example includes a video elementary stream loop (video ES loop) corresponding to a video stream and an audio elementary stream loop (audio ES loop) corresponding to an audio stream.

In the video elementary stream loop (video ES loop), information such as a stream type and a PID (packet identifier) corresponding to a video stream is arranged and a descriptor that describes information associated with the video stream is also arranged. A value of "Stream_type" of the video stream is set to "0x24," and PID information indicates the PID1 that is assigned to the PES packet "video PES" of the video stream as described above. As one descriptor, an HEVC descriptor is arranged.

In addition, in the audio elementary stream loop (audio ES loop), information such as a stream type and a PID (packet identifier) corresponding to an audio stream is arranged and a descriptor that describes information associated with the audio stream is also arranged. A value of "Stream_type" of the audio stream is set to "0x2C" and the PID information indicates the PID2 that is assigned to the PES packet "audio PES" of the audio stream as described above. As one descriptor, the tag table descriptor (Tag_table_descriptor( )) is arranged.

Figure 16:
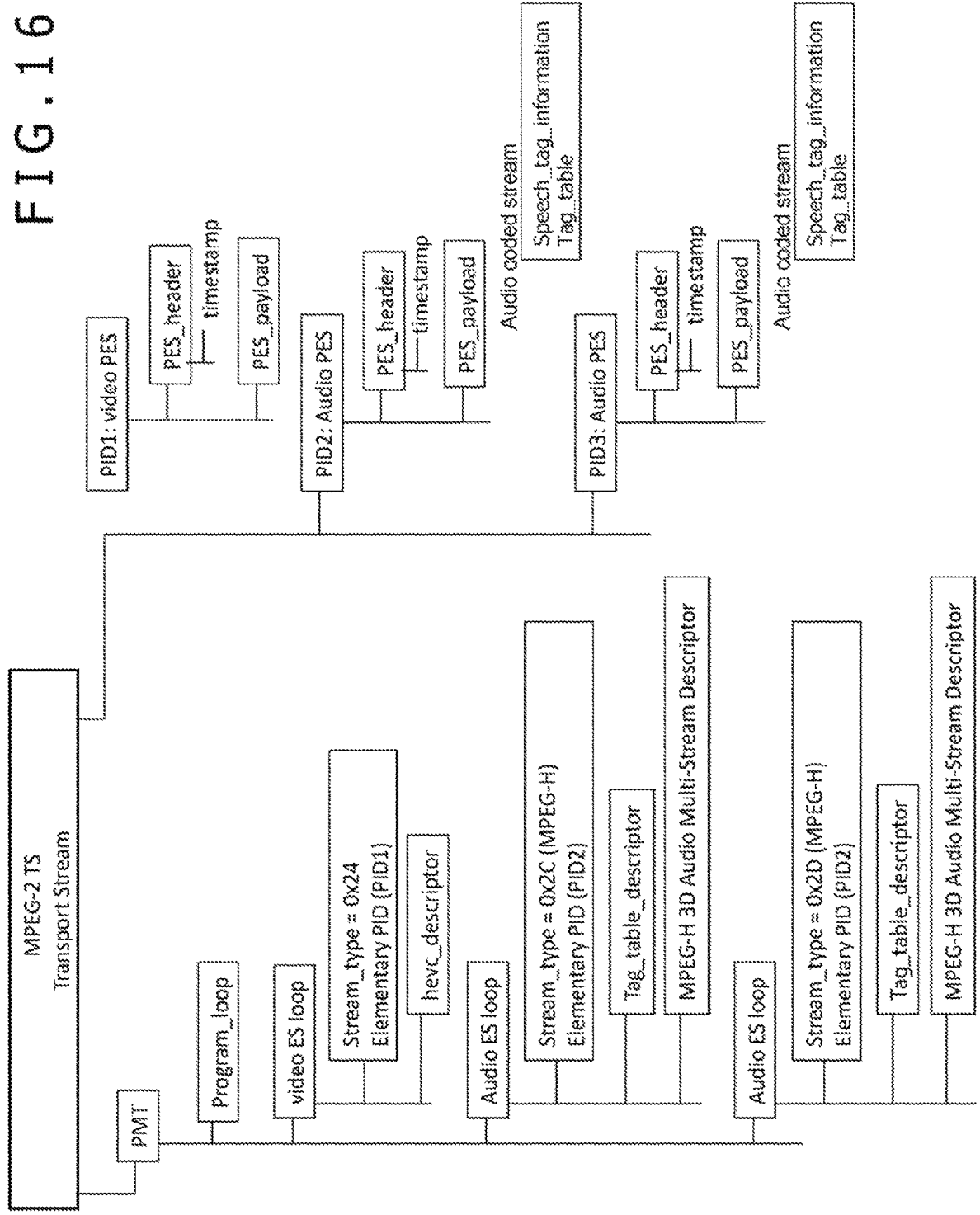
FIG. 16 is a diagram illustrating a configuration example of the transport stream TS in a case in which the transport data of the 3D audio is transmitted in two streams.

FIG. 16 illustrates a configuration example of the transport stream TS in a case in which the 3D audio transport data is transmitted by two streams (refer to FIG. 5(b)). The configuration example includes the PES packet "video PES" of the video stream that is identified as the PID1. In addition, the configuration example includes PES packets "audio PES" of two audio streams (Substream1 and Substream2) that are identified as the PID2 and a PID3, respectively.

The PES packet includes the PES header (PES_header) and the PES payload (PES_payload). Timestamps of DTS and PTS are inserted into the PES header. The synchronization between the apparatuses can be maintained in the entire system by applying the time stamps accurately, for example, by matching the time stamps of the PID2 and PID3 when multiplexing.

Audio streams (Audio coded streams) are inserted into the PES payload of the PES packets of two audio streams (Substream1 and Substream2). The tag information "Speech_tag_information( )" is inserted into the audio stream and also the table information "Tag_table( )" is inserted thereinto. Note that the tag information "Speech_tag_information( )" and the table information "Tag_table( )" may be inserted into only the main audio stream (Substream1) side.

In addition, in the transport stream TS, the PMT (Program Map Table) is included as the PSI (Program Specific Information). The PSI is information that describes a program to which each elementary stream included in the transport stream belongs. The PMT includes a program loop (Program loop) that describes information associated with the entire program.

In addition, the PMT includes an elementary stream loop having the information associated with each elementary stream. The configuration example includes the video elementary stream loop (video ES loop) corresponding to the video stream and the audio elementary stream loop (audio ES loop) corresponding to two audio streams (Substream1 and Substream2).

In the video elementary stream loop (video ES loop), information such as a stream type and a PID (packet identifier) corresponding to the video stream is arranged and a descriptor that describes information associated with the video stream is also arranged. A value of "Stream_type" of the video stream is set to "0x24," and the PID information indicates the PID1 that is assigned to the PES packet "video PES" of the video stream as described above. As one descriptor, the HEVC descriptor is arranged.

In each audio elementary stream loop (audio ES loop), information such as a stream type and a PID (packet identifier) corresponding to the audio stream is arranged and a descriptor that describes information associated with the audio stream is also arranged.

The PID2 is the main audio stream (Substream1) and a value of "Stream_type" is set to "0x2C" and the PID information indicates a PID that is assigned to the PES packet "audio PES" of the audio stream as described above. Further, the PID3 is the sub audio stream (Substream2) and a value of "Stream_type" is set to "0x2D" and the PID information indicates a PID that is assigned to the PES packet "audio PES" of the audio stream as described above.

In addition, in each audio elementary stream loop (audio ES loop), the tag table descriptor (Tag_table_descriptor( )) is arranged as one descriptor. Note that the tag table descriptor (Tag_table_descriptor( )) may be arranged in only the audio elementary stream loop on the main audio stream (Substream1) side.

Configuration Example of Service Receiver

Figure 17:
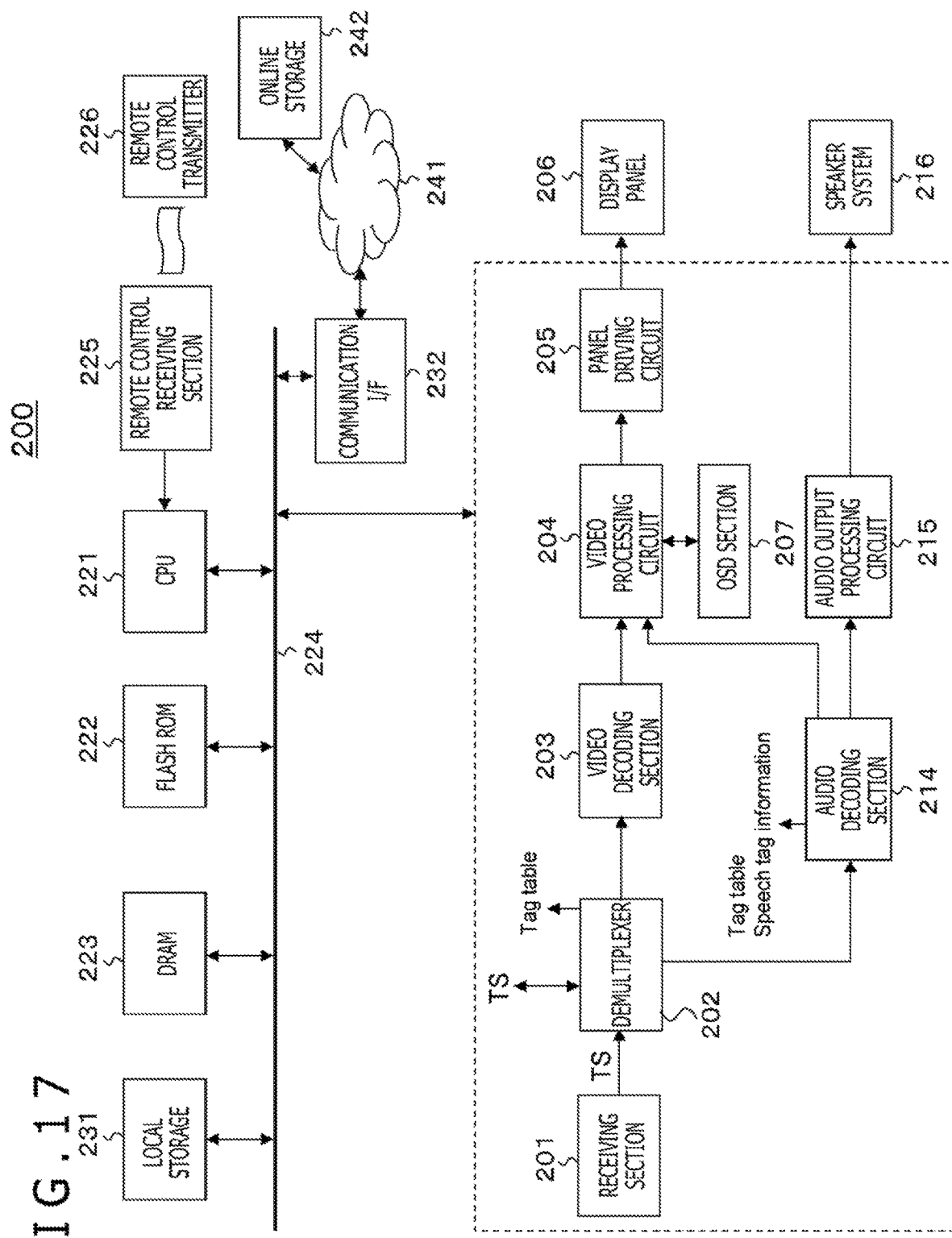
FIG. 17 is a block diagram illustrating a configuration example of a service receiver.

FIG. 17 illustrates a configuration example of the service receiver 200. The service receiver 200 includes a receiving section 201, a demultiplexer 202, a video decoding section 203, a video processing circuit 204, a panel driving circuit 205, a display panel 206, and an OSD (On Screen Display) section 207. In addition, the service receiver 200 includes an audio decoding section 214, an audio output circuit 215, and a speaker system 216.

In addition, the service receiver 200 includes a CPU 221, a flash ROM 222, a DRAM 223, an internal bus 224, a remote control receiving section 225, a remote control transmitter 226, a local storage 231, and a communication interface 232. To the communication interface 232, an online storage 242 is connected via a network 241 such as the Internet.

The CPU 221 controls operations of respective components of the service receiver 200. The flash ROM 222 stores control software and keeps data. The DRAM 223 constitutes a work area of the CPU 221. The CPU 221 deploys the software and data read from the flash ROM 222 in the DRAM 223 to start the software and controls the respective components of the service receiver 200.

The remote control receiving section 225 receives a remote control signal (a remote control code) transmitted from the remote control transmitter 226 and supplies the signal to the CPU 221. The CPU 221 controls the respective components of the service receiver 200 on the basis of the remote control code. The CPU 221, the flash ROM 222, the DRAM 223, the local storage 231, and the communication interface 232 are connected to the internal bus 224.

The receiving section 201 receives the transport stream TS transmitted from the service transmitter 100 on a broadcast wave or on a packet through a network. The transport stream TS includes an audio stream in addition to a video stream. The audio stream is an audio stream in which an audio frame including the audio compression data obtained by performing the encoding processing on the audio data is continuously arranged.

As described above, the tag information indicating that the audio compression data of the predetermined sound unit is included is inserted into the audio frame including the audio compression data of the predetermined sound unit. Further, as described above, the table information having information associated with the predetermined sound unit within the audio stream is inserted into a layer of the transport stream TS and/or a layer of the audio stream.

Here, the tag information "Speech_tag_information( )" is inserted into the audio frame including the audio compression data of the predetermined sound unit (refer to FIG. 5 and FIG. 10). In addition, the table information "Tag_table( )" is inserted into the audio frame of any audio frame (refer to FIG. 5 and FIG. 11). Further, the tag table descriptor (Tag_table descriptor( )) (refer to FIG. 13) is arranged in the audio elementary stream loop that is provided under the PMT.

The demultiplexer 202 extracts a video stream from the transport stream TS and sends the video stream to the video decoding section 203. The video decoding section 203 performs decoding processing on the video stream and obtains uncompressed video data. The video processing circuit 204 performs scaling processing, image quality regulating processing, or the like on the video data obtained in the video decoding section 203 and obtains video data for display.

The OSD section 207 generates a GUI display signal under the control of the CPU 221. The GUI display signal is sent to the video processing circuit 204 and is superimposed on the video data. The panel driving circuit 205 drives the display panel 206 on the basis of the image data for display obtained in the video processing circuit 204. The display panel 206 includes, for example, an LCD (Liquid Crystal Display), an organic EL display (organic electroluminescence display), or the like.

In addition, the demultiplexer 202 extracts various types of information such as descriptor information from the transport stream TS and sends the information to the CPU 221. The various types of information also include the above-described tag table descriptor. In accordance with the descriptor, the CPU 221 acquires the table information having information associated with the predetermined sound unit within the audio stream and recognizes the frame count information indicating a frame position from the service head of each sound unit, the sound unit identification information of each sound unit, the generation source identification information of each sound unit, or the like.

In addition, the demultiplexer 202 extracts an audio stream from the transport stream TS and sends the audio stream to the audio decoding section 214. The audio decoding section 214 performs decoding processing on the audio stream and obtains audio data for driving each speaker constituting the speaker system 216.

In this case, under the control of the CPU 221, in the audio decoding section 214, only coded data of any one piece of object content according to user selection is set as a decoding object among coded data of a plurality of pieces of object content constituting a switch group within coded data of a predetermined number of pieces of object content included in the audio stream.

In addition, the audio decoding section 214 extracts various types of information that are inserted into the audio stream and transmits the information to the CPU 221. The various types of information also include the above-described tag information "Speech_tag_information( )" and table information "Tag_table( )."

According to the tag information, for each audio frame, the CPU 221 can recognize the audio frame including the audio compression data of the predetermined sound unit, the sound unit identification information of the included sound unit, the generation source identification information of the sound unit, the frame count information, the type information indicating whether to include the start position/end position, the information associated with an offset from the frame head to the start position/end position, or the like.

In addition, according to the table information, the CPU 221 recognizes information associated with the predetermined sound unit within the audio stream, that is, the frame count information indicating the frame position from the service head of each sound unit, the sound unit identification information of each sound unit, the generation source identification information of each sound unit, or the like.

Further, under the control of the CPU 221 based on the tag information, the audio decoding section 214 segments the audio data corresponding to the predetermined sound unit from the audio data obtained in the decoding processing and writes the audio data in the buffer to temporarily hold the audio data. For example, when the user performs reproduction operation (instantaneous repeat operation), under the control of the CPU 221, the audio decoding section 214 reads the audio data of the sound unit from the buffer, and directly outputs the audio data as audio data, performs a text conversion to output the audio data as caption display data, or performs both of the above. The caption display data is sent to the video processing circuit 204 and is superimposed on the video data.

In this case, in a case of outputting the audio data as audio data, the audio data read from the buffer is output in place of the audio data obtained in the decoding processing or is mixed with the audio data obtained in the decoding processing to be output. Further, in a case of outputting the audio data only as the caption display data, output of the audio data obtained in the decoding processing is continued.

Further, under the control of the CPU 221 based on the tag information, when the user performs a caption conversion display operation, the audio decoding section segments the audio data of the sound unit of the instructed switch group, the group, the generation source (speaker), or the like, performs a text conversion, and outputs the audio data as the caption display data. The caption display data is sent to the video processing circuit 204 and is superimposed on the video data. The audio decoding section 214 will be further described in detail below.

The audio output processing circuit 215 performs necessary processing such as D/A conversion and amplification on the audio data for driving each speaker obtained in the audio decoding section 214 and supplies the result to the speaker system 216. The speaker system 216 includes a plurality of speakers of a plurality of channels, for example, 2 channel, 5.1 channel, 7.1 channel, 22.2 channel, and the like.

In response to a user operation, under the control of the CPU 221, the transport stream TS sent from the receiving section 201 through the demultiplexer 202 is written and held in the local storage 231. Further, under the control of the CPU 221, the held transport stream TS is read from the local storage 231 and is sent to the demultiplexer 202.

In response to the user operation, under the control of the CPU 221, the communication interface 232 writes the transport stream TS sent from the receiving section 201 through the demultiplexer 202 in the online storage 242 through the network 241 and holds the transport stream TS therein. Further, under the control of the CPU 221, the communication interface 232 reads the transport stream TS held in the online storage 242 through the network 241 and sends the transport stream TS to the demultiplexer 202.

On the basis of the information associated with the predetermined sound unit included in the table information, the CPU 221 can control the transport stream TS to be read from the storage. For example, the CPU 221 can control the container stream to be read from a frame position including the sound unit according to user selection.

Figure 18:
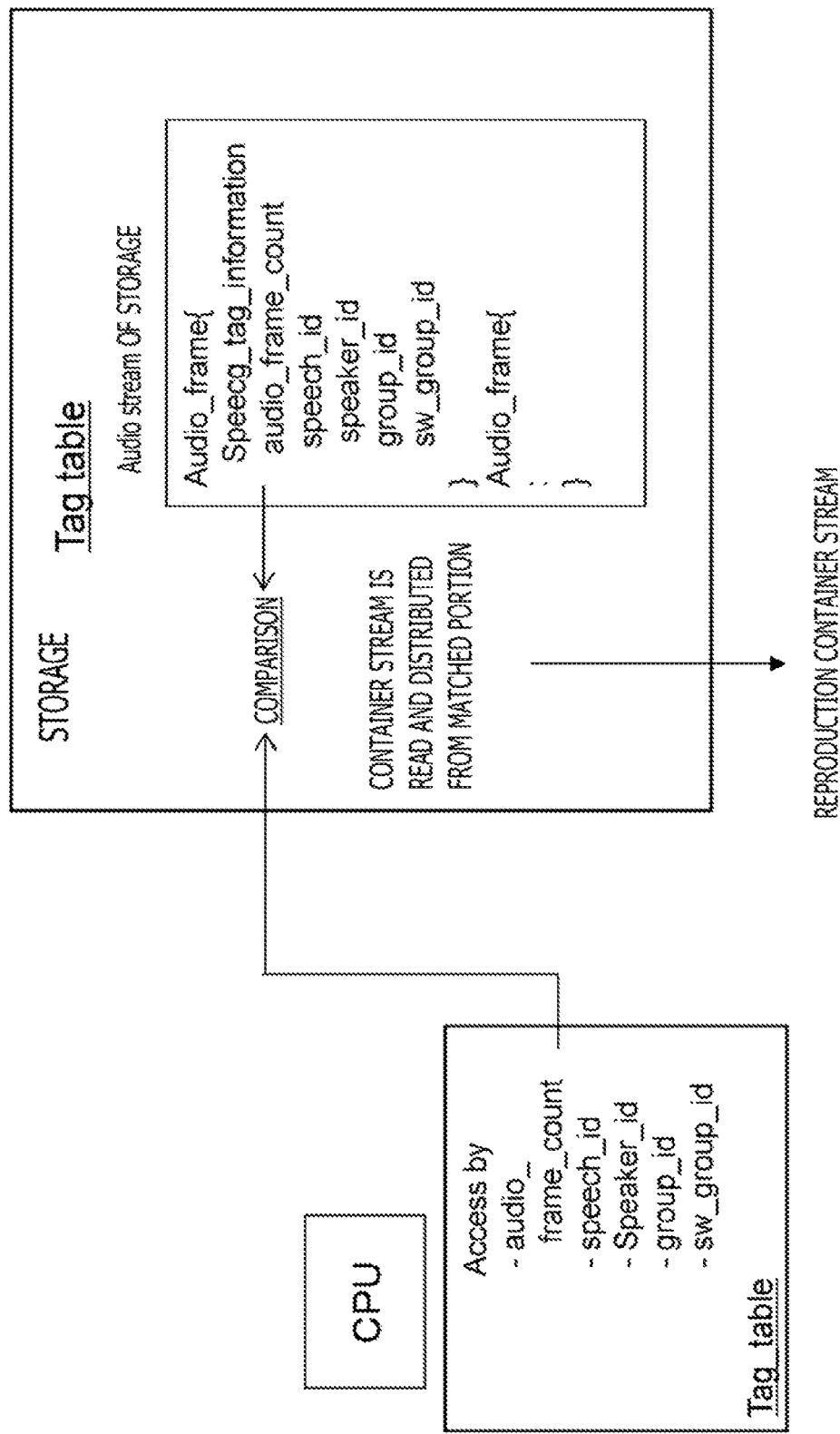
FIG. 18 is a diagram describing an operation of reading (reproduction) from a storage.

In this case, the user refers to a display of information associated with each sound unit within the audio stream displayed on the display panel 206 and selects the sound unit as a reading position. As illustrated in FIG. 18, the CPU 221 sends a reading command along with the tag information ("audio_frame_count," "speech_id," "speaker_id," and the like) corresponding to the selected sound unit to the local storage 231, or the online storage 242 through the communication interface 232. The storage compares the reading command with the tag information "Speech_tag_information" or other table information "Tag_table" associated with a predetermined container stream or the audio stream, reads the container stream from a matched part, and sends the container stream to the demultiplexer 202. In this case, a time position from the service head of the audio stream is specified by using "audio_frame_count," an object group within the audio stream is specified by using "group_id/sw_group_id," the sound unit (voice) in the order of time series is specified by using "speech_id," and further the sound unit (voice) of a specified speaker is specified by using "speaker_id" to thereby reproduce an intended voice, or not only voices but also other data such as videos included in the container at the timing.

Configuration Example of Audio Decoding Unit

Figure 19:
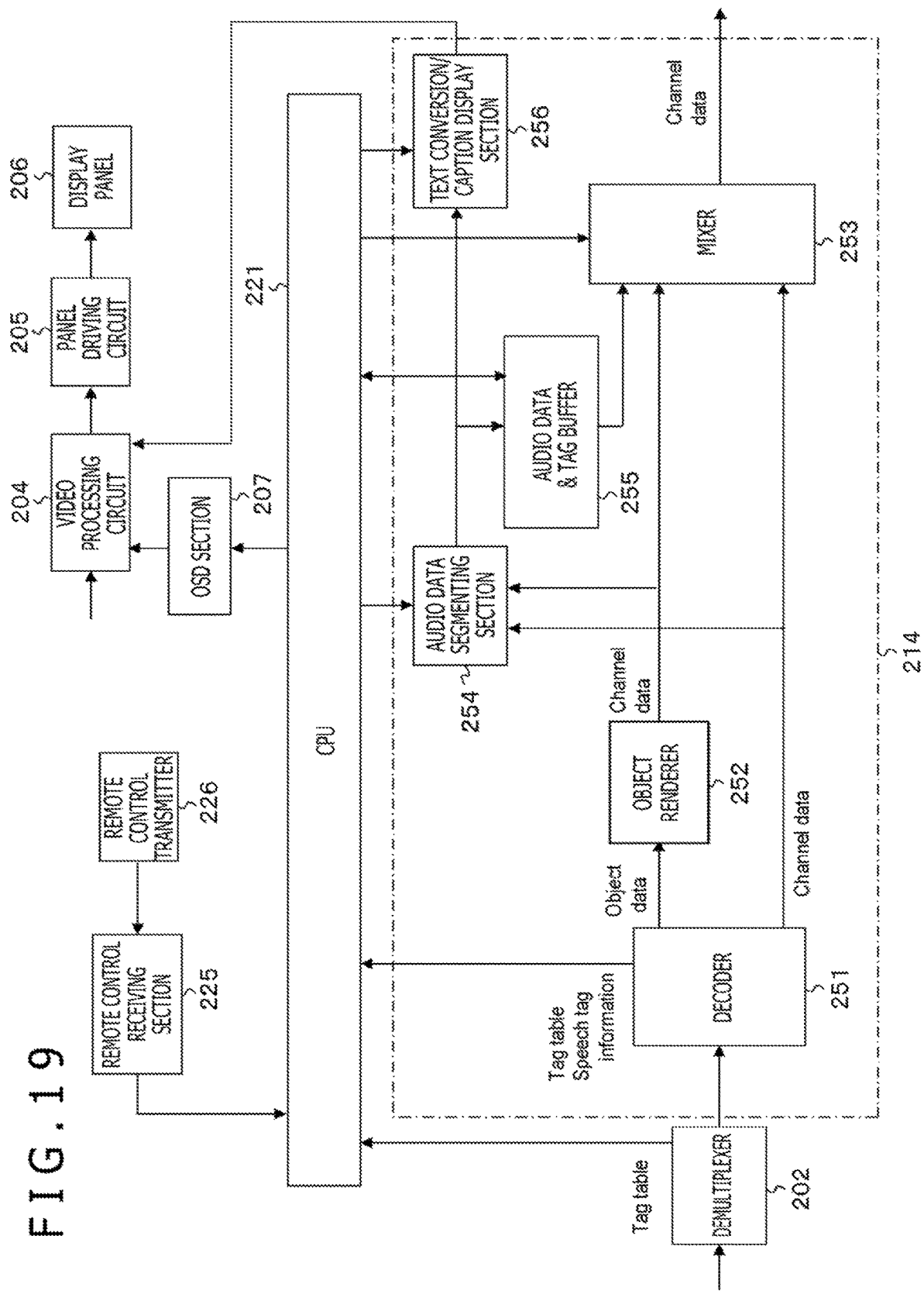
FIG. 19 is a block diagram illustrating a configuration example of an audio decoding section.

FIG. 19 illustrates a configuration example of the audio decoding section 214. The audio decoding section 214 includes a decoder 251, an object renderer 252, a mixer 253, an audio data segmenting section 254, an audio data & tag buffer 255, and a text conversion/caption display section 256.

The decoder 251 performs decoding processing on the audio stream extracted by the demultiplexer 202 and obtains object data of the predetermined number of pieces of object content in addition to the channel data. The decoder 251 performs the processes of the audio encoder 113 of the stream generating section 110 of FIG. 14 approximately in reverse order. It is noted that, in a plurality of pieces of object content constituting a switch group, only object data of any one piece of object content according to user selection is obtained under the control of the CPU 221.

In addition, the decoder 251 extracts various types of information that are inserted into the audio stream and transmits the information to the CPU 221. The various types of information also include the above-described tag information "Speech_tag_information( )" and table information "Tag_table( )."

According to the tag information, for each audio frame, the CPU 221 can recognize the audio frame including the audio compression data of the predetermined sound unit, the sound unit identification information of the included sound unit, the generation source identification information of the sound unit, the frame count information, the type information indicating whether to include the start position/end position, the information associated with an offset from the frame head to the start position/end position, or the like. In addition, according to the table information, the CPU 221 recognizes information associated with the predetermined sound unit within the audio stream, that is, the frame count information indicating the frame position from the service head of each sound unit, the sound unit identification information of each sound unit, the generation source identification information of each sound unit, or the like.

The object renderer 252 performs rendering processing on object data of the predetermined number of pieces of object content and obtains channel data of the predetermined number of pieces of object content. Here, the object data includes audio data of an object sound source and position information of the object sound source. The object renderer 252 obtains channel data by mapping audio data of an object sound source with any speaker position on the basis of position information of the object sound source.

The mixer 253 combines channel data of each piece of object content obtained in the object renderer 252 with channel data obtained in the decoder 251 and obtains channel data (audio data) for driving each speaker constituting the speaker system 216.

Under the control of the CPU 221 based on the tag information, the audio data segmenting section 254 sequentially segments the audio data of the sound unit indicated by the tag information from the audio data (channel data) obtained in the decoder 251 or the audio data (channel data) of each piece of object content obtained in the object renderer 252.

In an example illustrated in FIG. 6, for example, the audio data according to the sound unit 1 of an audio content 1 is segmented from the audio frames f1 to f2. In the segmentation, information indicating offsets of "xs1" and "xe1" is used in order to accurately segment the audio data according to the sound unit 1. Continuously, the audio data according to the sound unit 2 of an audio content 2 is segmented from the audio frames f3 to f4. In the segmentation, information indicating offsets of "xs2" and "xe2" is used in order to accurately segment the audio data according to the sound unit 1.

Under the control of the CPU 221, in the audio data & tag buffer 255, the audio data of the sound unit segmented by the audio data segmenting section 254 and the tag information of the sound unit are associated with each other and read to be held. In the audio data & tag buffer 255, the latest predetermined number segmented by the audio data segmenting section 254, for example, only information associated with two sound units is held. Note that in the audio data & tag buffer 255, only information associated with the sound unit segmented by the audio data segmenting section 254 within a certain time in the past may be held.

Figures 20, 21, 22:
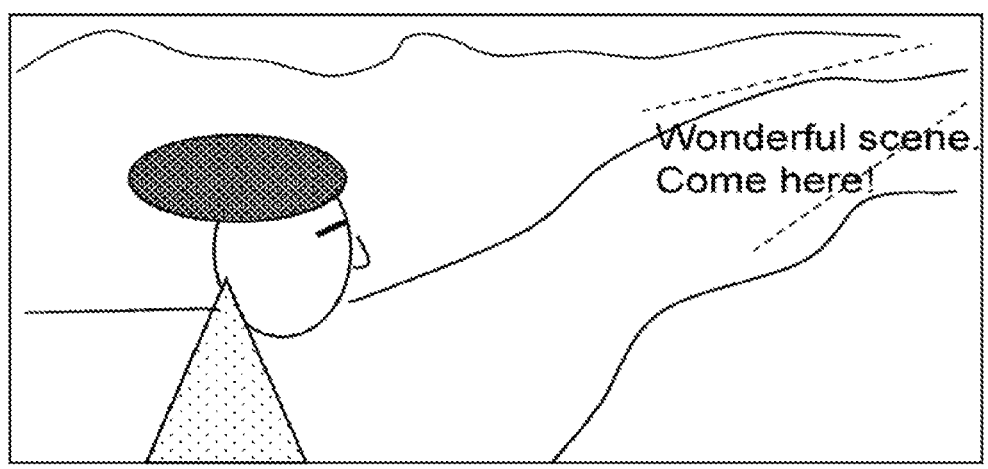
FIG. 20 is a diagram illustrating an example of a hold content of an audio data & tag buffer.
FIG. 21 is a diagram illustrating an example of information associated with the sound unit displayed on a display panel.
FIG. 22 is a diagram illustrating a caption display example on the display panel.

FIG. 20 illustrates an example of a hold content of the audio data & tag buffer 255. In the illustrated example, the information associated with the two sound units of the sound unit 1 (Unit 1) and the sound unit 2 (Unit 2) is held. As information of the sound unit 1 (Unit 1), the audio data (audio content 1 data) of the sound unit is provided in addition to the frame count information "audio_frame_count," the sound unit identification information "speech_id," and the generation source (speaker) information "speaker_id." Further, as information of the sound unit 2 (Unit 2), the audio data (audio content 2 data) of the sound unit is provided in addition to the frame count information "audio_frame_count," the sound unit identification information "speech_id," and the generation source (speaker) identification information "speaker_id."

Here, for example, the frame count information "audio_frame_count" indicates the frame count value indicating the frame position from the service head of the audio frame including the start position. Note that the frame count information "audio_frame_count" may further hold the frame count value indicating the frame position from the service head of the audio frame including the end position. In addition, as the tag information held in the audio data & tag buffer 255, other information included in the tag information "Speech_tag_information( )" may further be included.

The text conversion/caption display section 256 converts the audio data of each sound unit segmented by the audio data segmenting section 254 or the audio data read from the audio data & tag buffer 255 to the text data, further converts the text data into bit map data to thereby generate caption display data, and supplies the caption display data to the video processing circuit 204 as a signal superimposed on the video data.

In response to the user operation, under the control of the CPU 221, the information associated with each sound unit held in the audio data & tag buffer 255 is displayed on the display panel 206. In this case, under the control of the CPU 221, a GUI display signal generated from the OSD section 207 is sent to the video processing circuit 204 and is superimposed on the video data. FIG. 21 illustrates an example of a display example. The display example corresponds to the hold content of the audio data & tag buffer 255 illustrated in FIG. 20. Note that the generation source (speaker) may be set to be viscerally displayed along with the generation source (speaker) identification information "speaker_id" or in place thereof.

The user can perform an operation for reading and outputting any of the sound units from among the audio data of each sound unit held in the audio data & tag buffer 255. As described above, for example, the information associated with each sound unit held in the audio data & tag buffer 255 is displayed on the display panel 206 and then a desired sound unit is selected to thereby perform the user operation. In this case, the audio data of the selected sound unit is read from the audio data & tag buffer 255.

Further, the information associated with each sound unit is not displayed on the display panel 206 and a reproduction operation is performed to thereby perform the user operation (instantaneous repeat operation). In this case, the audio data of the latest sound unit is read from the audio data & tag buffer 255 among the audio data of each held sound unit.

As described above, the audio data read from the audio data & tag buffer 255 is enabled to be directly output as the audio data, output as the caption display data, or output as both the audio data and the caption display data. How to output the audio data can be selected by an operation of the user.

In the case of outputting the audio data as audio data, the audio data read from the audio data & tag buffer 255 is supplied to the mixer 253 and is mixed into the channel data supplied from the decoder 251 or the object renderer 252, or in place of the above, the audio data is output from the mixer 253.

Further, in a case of outputting the audio data as the caption display data, the audio data read from the audio data & tag buffer 255 is supplied to the text conversion/caption display section 256, converted into the text data, further converted into bit map data to thereby generate the caption display data, and supplied to the video processing circuit 204 as the signal superimposed on the video data. This process permits the caption display data to be displayed on an image as the caption in the display panel 206. FIG. 22 illustrates a caption display example in the display panel 206. In the illustrated example, a caption display of "Wonderful scene. Come here!" is displayed.

Further, the user can set a caption corresponding to the audio data of each sound unit segmented by the audio data segmenting section 254 to be enabled to be always displayed on the display panel 206 (caption conversion display operation). In this case, the user can instruct the switch group, the group, the generation source (speaker), or the like of the sound unit segmented by the audio data segmenting section 254.

The audio data of each sound unit segmented by the audio data segmenting section 254 is supplied to the text conversion/caption display section 256, converted into the text data, further converted into bit map data to thereby generate the caption display data, and supplied to the video processing circuit 204 as the signal superimposed on the video data. This process permits the caption display data to be displayed on an image as the caption in the display panel 206.

Operations of the service receiver 200 illustrated in FIG. 17 will be briefly described. The receiving section 201 receives the transport stream TS transmitted from the service transmitter 100 on a broadcast wave or on a packet through a network. The transport stream TS includes an audio stream in addition to a video stream.

The audio stream is an audio stream in which an audio frame including audio compression data obtained by performing encoding processing on audio data is continuously arranged. The tag information (refer to FIG. 10) indicating that the audio compression data of the predetermined sound unit is included is inserted into the audio frame including the audio compression data of the predetermined sound unit. Further, table information (refer to FIG. 11 and FIG. 13) having information associated with the predetermined sound unit within the audio stream is inserted into a layer of the transport stream TS and/or a layer of the audio stream.

The transport stream TS is supplied to the demultiplexer 202. The demultiplexer 202 extracts a video stream from the transport stream TS and supplies the video stream to the video decoding section 203. The video decoding section 203 performs decoding processing on the video stream and obtains uncompressed video data. The video data is supplied to the video processing circuit 204.

The video processing circuit 204 performs scaling processing, image quality regulating processing, or the like on the video data and obtains video data for display. The video data for display is supplied to the panel driving circuit 205. The panel driving circuit 205 drives the display panel 206 on the basis of the video data for display. This process permits an image corresponding to the video data for display to be displayed on the display panel 206.

In addition, the demultiplexer 202 extracts various types of information such as descriptor information from the transport stream TS and sends the information to the CPU 221. The various types of information also include the above-described tag table descriptor. According to the descriptor, the CPU 221 acquires the table information having information associated with the predetermined sound unit within the audio stream and recognizes the frame count information indicating the frame position from the service head of each sound unit, the sound unit identification information of each sound unit, the generation source identification information of each sound unit, or the like.

In addition, the demultiplexer 202 extracts an audio stream from the transport stream TS and sends the audio stream to the audio decoding section 214. The audio decoding section 214 performs decoding processing on the audio stream and obtains audio data for driving each speaker constituting the speaker system 216.

In addition, the audio decoding section 214 extracts various types of information that are inserted into the audio stream and transmits the information to the CPU 221. The various types of information also include the tag information "Speech_tag_information( )" and the table information "Tag_table( )."

According to the tag information, for each audio frame, the CPU 221 recognizes the audio frame including the audio compression data of the predetermined sound unit, the sound unit identification information of the included sound unit, the generation source identification information of the sound unit, the frame count information, the type information indicating whether to include the start position/end position, the information indicating an offset from the frame head to the start position/end position, or the like.

In addition, according to the table information, the CPU 221 recognizes information associated with the predetermined sound unit within the audio stream, that is, the frame count information indicating the frame position from the service head of each sound unit, the sound unit identification information of each sound unit, the generation source identification information of each sound unit, or the like.

Further, on the basis of the tag information under the control of the CPU 221 based on the tag information, the audio decoding section 214 segments the audio data corresponding to the predetermined sound unit from the audio data obtained by the decoding processing and temporarily holds the audio data in the buffer. Under the control of the CPU 221, for example, when the user performs a reproduction operation (instantaneous repeat operation), the audio decoding section 214 reads the audio data of the sound unit from the buffer, and directly output the audio data as audio data, performs a text conversion to output the audio data as caption display data, or performs both of the above. The caption display data is sent to the video processing circuit 204 and is superimposed on the video data.

In this case, in a case of outputting the audio data as audio data, the audio data read from the buffer is output in place of the audio data obtained by the decoding processing or is mixed with the audio data obtained by the decoding processing to be output. Further, in a case of outputting the audio data only as the caption display data, an output of the audio data obtained by the decoding processing is continued.

Further, on the basis of the tag information, under the control of the CPU 221, when the user performs a caption conversion display operation, the audio decoding section segments the audio data of the sound unit of the instructed switch group, the group, the generation source (speaker), or the like, performs a text conversion, and outputs the audio data as caption display data. The caption display data is sent to the video processing circuit 204 and is superimposed on the video data.

The audio data for driving each speaker obtained by the audio decoding section 214 is supplied to the audio output processing circuit 215. The audio output processing circuit 215 performs necessary processing such as D/A conversion or amplification on the audio data. Then, the audio data after the processing is supplied to the speaker system 216. Through this process, an acoustic output corresponding to the display image on the display panel 206 is obtained from the speaker system 216.

In response to the user operation, under the control of the CPU 221, the transport stream TS sent from the receiving section 201 through the demultiplexer 202 is written in the local storage 231. Further, in response to the user operation, under the control of the CPU 221, the held transport stream TS is read from the local storage 231 and is sent to the demultiplexer 202. The following processing to the transport stream TS is similar to that to the transport stream TS supplied from the above-described receiving section 201.

Further, in response to the user operation, under the control of the CPU 221, the communication interface 232 writes the transport stream TS sent from the receiving section 201 through the demultiplexer 202 in the online storage 242 through the network 241. Further, in response to the user operation, under the control of the CPU 221, the communication interface 232 reads the transport stream TS held in the online storage 242 through the network 241 and sends the transport stream TS to the demultiplexer 202. The following processing to the transport stream TS is similar to that to the transport stream TS supplied from the above-described receiving section 201.

In response to the user operation, the CPU 221 controls the transport stream TS to be read from the storages (the local storage 231 and the online storage 242) on the basis of the information associated with the predetermined sound unit included in the table information. For example, the CPU 221 controls the container stream to be read from the frame position including the sound unit selected by the user.

In this case, the user refers to an information display associated with the predetermined sound unit included in the table information displayed on the display panel 206 and selects the sound unit as a reading position. In response to the selection, the CPU 221 sends the reading command having the frame count value indicating the frame position from the service head corresponding to the selected sound unit to the local storage 231 or the online storage 242 through the communication interface 232. In each of the storages, reading of the container stream is started from the frame position including the sound unit selected by the user on the basis of the frame count value.

As described above, in the transmitting and receiving system 10 illustrated in FIG. 1, the service transmitter 100 inserts the tag information indicating that the audio compression data of the predetermined sound unit is included into the audio frame including the audio compression data of the predetermined sound unit. Therefore, the audio data corresponding to the predetermined sound unit is easily enabled to be segmented and used for a sound output, a caption display, or the like on the basis of the tag information on the receiving side.

Further, in the transmitting and receiving system 10 illustrated in FIG. 1, the service transmitter 100 inserts the table information having information associated with the predetermined sound unit within the audio stream into a layer of the container stream and/or a layer of the audio stream. Therefore, it is possible to perform processing based on the information associated with the predetermined sound unit included in the table information on the receiving side.

For example, by the storage in which the container stream is written, it is possible to easily perform the reading from a position in which the audio compression data of the predetermined sound unit is included.

2. Modification Example

It is to be noted that, in the above-described embodiment, an example in which a container stream (multiplexed stream) is an MPEG-2 transport stream (transport stream TS) has been described. However, the present technology can be similarly applied also to a system in which distribution is performed in the container stream of MP4 or another format. The examples include a MPEG-DASH-based stream distribution system, a transmitting and receiving system that handles an MMT (MPEG Media Transport) structure transport stream, and the like.

Figure 23:
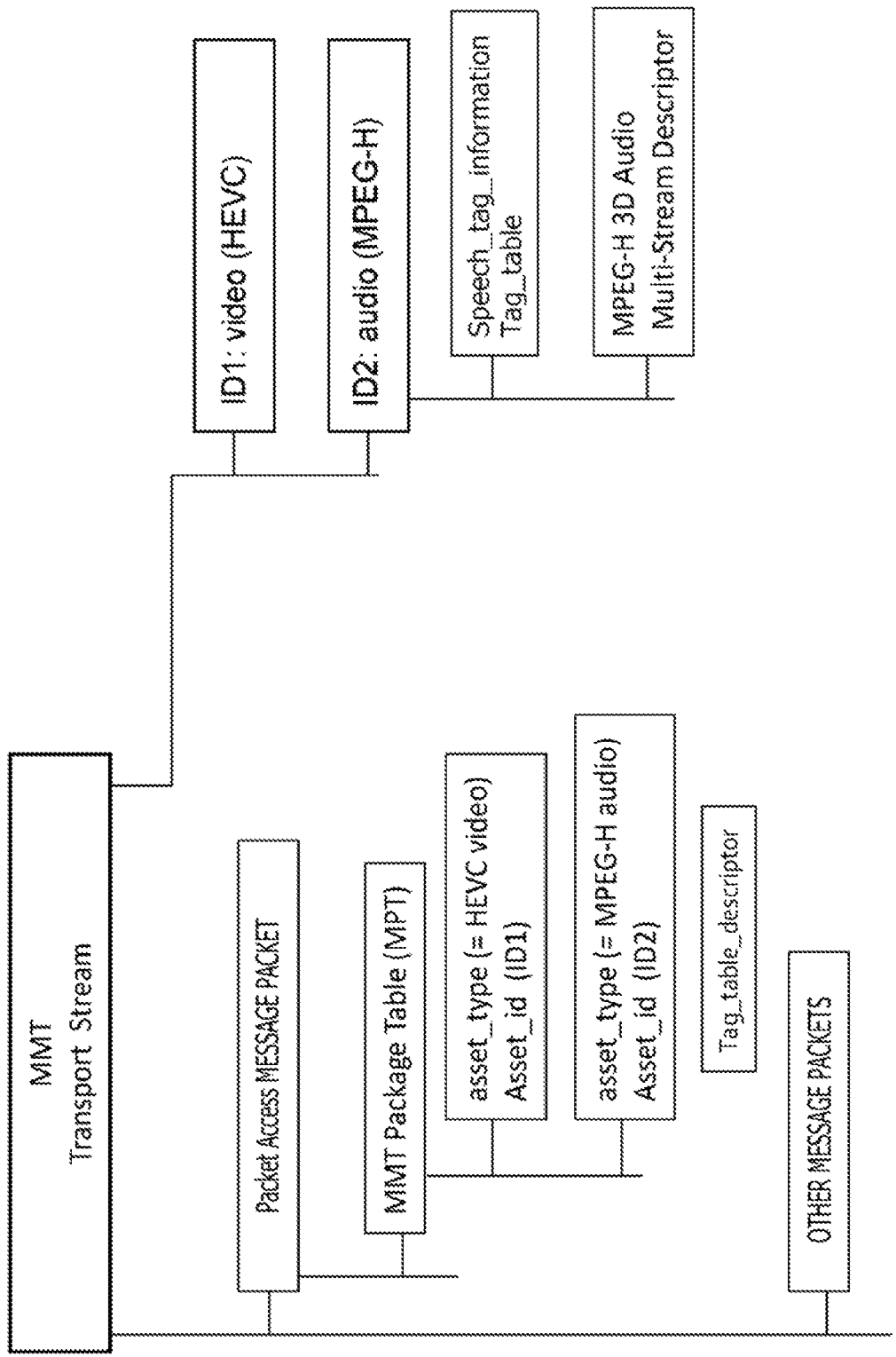
FIG. 23 is a diagram illustrating a configuration example of an MMT stream.

FIG. 23 illustrates a configuration example of an MMT stream in a case of inserting media access information (container object data) into the audio stream and sending the audio stream. An MMT packet of each asset of video, audio, or the like is provided in the MMT stream. The configuration example includes an MMT packet of an asset of a video that is identified as an ID1 and an MMT packet of an asset of audio that is identified as an ID2. The tag information "Speech_tag_information( )" (refer to FIG. 10) is inserted into the asset (audio stream) of the audio and also the table information "Tag_table( )" (refer to FIG. 11) is inserted thereinto.

In addition, the MMT stream includes a message packet such as a PA (Packet Access) message packet. The PA message packet includes a table such as an MMT packet table (MMT Package Table). The MP table includes information for each asset. In this case, the tag table descriptor (refer to FIG. 13) is also included as information of the asset of the audio.

Figure 24:
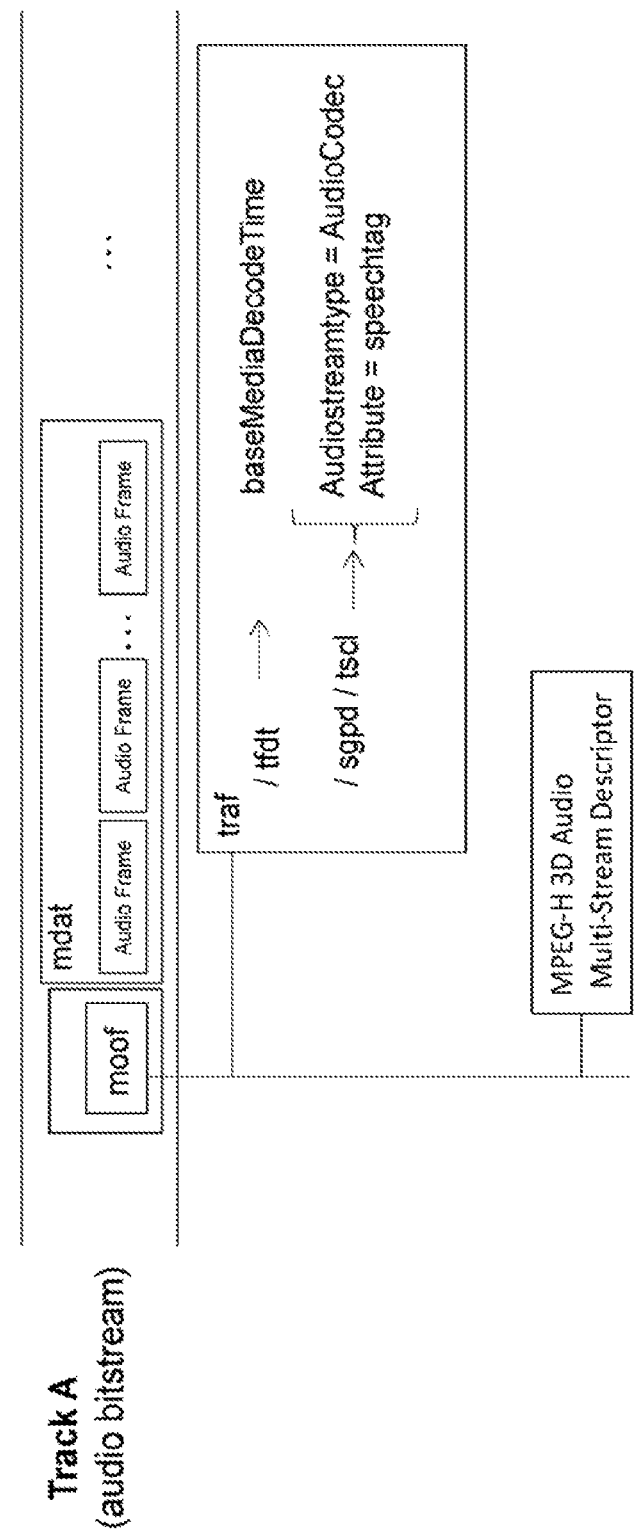
FIG. 24 is a diagram illustrating a configuration example of an MP4 stream (file) including data of an audio track in a case in which an audio compression format is an AC4.

FIG. 24 illustrates a configuration example of an MP4 stream (file) including data of an audio track (track A). The illustrated example is an example in a case of a fragmented MP4 (Fragmented MP4). In the MP4 stream, a movie fragment (Movie Fragment) including a "moof" box in which control information is included and an "mdat" box in which a media data body is included is provided in a predetermined number. A fragment obtained by fractionating track data is included in the "mdat" box and therefore the control information that is included in the "moof" box is control information regarding the fragment.

In the MP4 stream "audio bitstream" corresponding to the audio track, a predetermined number of audio frames (Audio Frame) are provided in the "mdat" box of each movie fragment. In addition, in the MP4 stream "audio bitstream," a "traf" box is provided in the "moof" box of each movie fragment and a "tfdt" box is provided in the "traf" box. In the "tfdt" box, a decode time "baseMediaDecodeTime" of a first access unit after the "moof" box is described.

Further, the "tfdt" box is provided in the "moof" box, an "sgpd" box is provided in the "tfdt" box, and a "tscl" box is provided in the "sgpd" box. Parameters of "Audiostreamtype" and "Attribute" are described in the "tscl" box. "Audiostreamtype=AudioCodec" indicates an audio compression format. "Attribute=speech tag" indicates that the tag information "Speech_tag_information( )" is inserted into the audio stream.

FIG. 25 illustrates an MPD file description example. Further, FIG. 26 illustrates contents of primary information in the description example. In the past, as everybody knows, in the MPEG-DASH-based stream distribution system, a media stream (MP4 stream) and the MPD file as a metafile have been transmitted to the receiving side through a communication network transmission path.

Descriptions of "<AdaptationSet mimeType="audio/mp4" group="1">" indicate that an adaptation set (AdaptationSet) corresponding to the audio stream is included, the audio stream is supplied with an MP4 file structure, and a group 1 is assigned to the audio stream. Further, descriptions of "<SupplementaryDescriptor schemeIdUri="urn:brdcst:codecType" value="Audio Codec"/>" indicate a codec of the audio stream. The codec includes MPEG-H, AAC, AC3, AC4, and the like. Further, descriptions of "<SupplementaryDescriptor schemeIdUri="urn:brdcst:speechtagContained" value="true"/>" indicate that the tag information "Speech_tag_information( )" is included.

Further, the above-described embodiment describes an example in which the audio compression format is MPEG-H 3D Audio. However, the present technology can be similarly applied also to a case in which the audio compression format is another audio compression format of AAC, AC3, AC4, or the like.

FIG. 27(a) illustrates a structure of a layer of an AC4 simple transport (Simple Transport). There are a field of a syncword (syncWord), a field of a frame length (frame Length), a field of "RawAc4Frame" as a coded data field, and a CRC field. As illustrated in FIG. 27(b), in the field of "RawAc4Frame," there is a field of TOC (Table Of Content) in the beginning, and there are fields of a predetermined number of substreams (Substream) thereafter.

Figure 28:
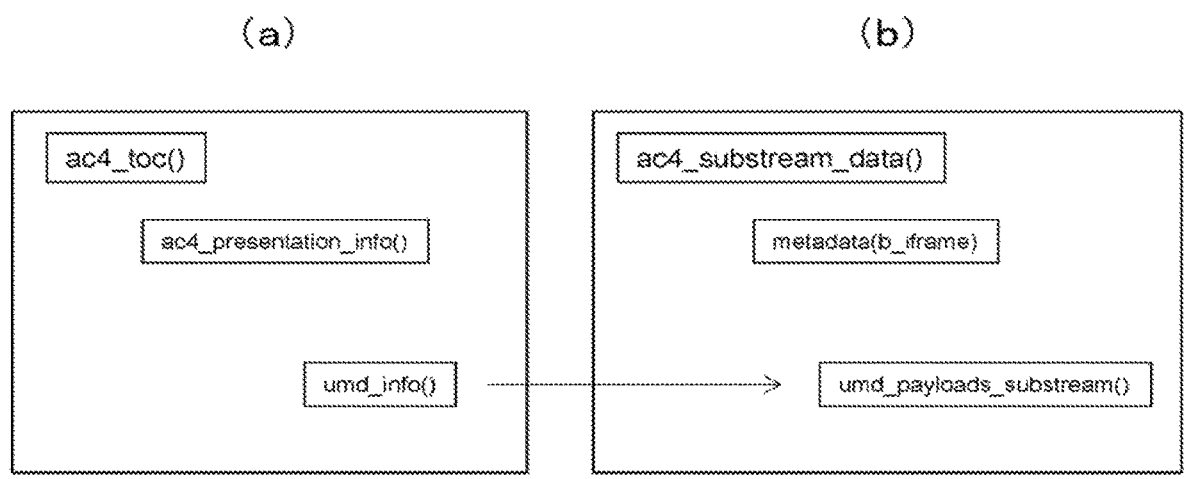
FIG. 28 is a diagram illustrating a schematic configuration of a TOC (ac4_toc( )) and a substream (ac4_substream_data( ).

As illustrated in FIG. 28(b), in the substream (ac4_substream_data( )), there is a metadata area (metadata) and a field of "umd_payloads_substream( )" is provided therein. The tag information "Speech_tag_information( )" (refer to FIG. 10) and the table information "Tag_table( )" (refer to FIG. 11) are placed in a field of "umd_payload_byte" in the field of "umd_payloads_substream( )."

It is noted that, as illustrated in FIG. 28(a), there is a field of "ac4_presentation_info( )" in TOC (ac4_toc( )), and further there is a field of "umd_info( )" therein, which indicates that there is the tag information or the like inserted into the field of "umd_payloads_substream( )" described above.

It is to be noted that, the present technology may employ the following configurations.

(1) A transmitting apparatus including:

a stream generating section configured to generate an audio stream in which an audio frame including audio compression data obtained by performing encoding processing on audio data is continuously arranged;

an information inserting section configured to insert tag information indicating that the audio compression data of a predetermined sound unit is included into the audio frame including the audio compression data of the predetermined sound unit; and a transmitting section configured to transmit a container stream of a predetermined format including the audio stream into which the tag information is inserted.

(2) The transmitting apparatus according to (1) above, in which the tag information has type information indicating that a start position of the audio compression data of the predetermined sound unit is included, an end position thereof is included, or neither of the start position and the end position is included.

(3) The transmitting apparatus according to (2) above, in which the tag information has offset information indicating an offset of a sample unit from a frame head to the start position when the type information indicates that the start position is included and indicating an offset of a sample unit from a frame head to the end position when the type information indicates that the end position is included.

(4) The transmitting apparatus according to any one of (1) to (3) above, in which the tag information has frame count information indicating a frame position from a service head of the audio frame into which the tag information is inserted.

(5) The transmitting apparatus according to any one of (1) to (4) above, in which when the predetermined sound unit is provided in plurality, the tag information has sound unit identification information for identifying a corresponding sound unit.

(6) The transmitting apparatus according to any one of (1) to (5) above, in which when the predetermined sound unit is provided in plurality and sound units of a plurality of generation sources are included in the plurality of sound units, the tag information has generation source identification information for identifying the generation source of the corresponding sound unit.

(7) The transmitting apparatus according to any one of (1) to (6) above, in which the stream generating section performs encoding processing on the audio data of a plurality of groups and generates the audio stream in which the audio frame including the audio compression data of the plurality of groups is continuously arranged, and the tag information has group identification information for identifying a group to which the audio compression data of the predetermined sound unit belongs.

(8) The transmitting apparatus according to (7) above, in which when a group indicated by the group identification information is a group constituting a predetermined switch group, the tag information has switch group identification information for identifying the predetermined switch group.

(9) The transmitting apparatus according to any one of (1) to (8) above, in which the information inserting section further inserts table information having information associated with the predetermined sound unit within the audio stream into a layer of the container stream and/or a layer of the audio stream.

(10) The transmitting apparatus according to (9) above, in which when the predetermined sound unit is provided in plurality, information associated with the plurality of sound units has sound unit identification information for identifying the corresponding sound unit, individually.

(11) The transmitting apparatus according to (9) or (10) above, in which when the predetermined sound unit is provided in plurality and the sound units of a plurality of generation sources are included in the plurality of sound units, information associated with the plurality of sound units has generation source identification information for identifying a generation source of the corresponding sound unit, individually.

(12) The transmitting apparatus according to any one of (9) to (11) above, in which information associated with the predetermined sound unit has frame count information indicating a frame position from a service head of the audio frame including the audio compression data of the predetermined sound unit.

(13) A transmitting method including:

a stream generating step of generating an audio stream in which an audio frame including audio compression data obtained by performing encoding processing on audio data is continuously arranged;

an information inserting step of inserting tag information indicating that the audio compression data of a predetermined sound unit is included into the audio frame including the audio compression data of the predetermined sound unit; and a transmitting step of transmitting, by a transmitting section, a container stream of a predetermined format including the audio stream into which the tag information is inserted.

(14) A receiving apparatus including:

a receiving section configured to receive a container stream of a predetermined format including an audio stream in which an audio frame including audio compression data is continuously arranged, in which the audio frame including the audio compression data of a predetermined sound unit includes tag information indicating that the audio compression data of the predetermined sound unit is included, the receiving apparatus, further including a processing section configured to perform a process of the audio stream by using the tag information.

(15) The receiving apparatus according to (14) above, in which the processing section includes a decoding section configured to perform decoding processing on the audio compression data included in each audio frame of the audio stream and obtain audio data, and a data segmenting and holding section configured to segment the audio data corresponding to the predetermined sound unit from the audio data obtained by the decoding section and hold the audio data in a buffer on the basis of the tag information.

(16) The receiving apparatus according to (15) above, in which the processing section further includes a data output section configured to read and output the audio data corresponding to the predetermined sound unit from the buffer on the basis of operational information of a user.

(17) The receiving apparatus according to any one of (14) to (16) above, in which the processing section further includes a decoding section configured to perform decoding processing on the audio compression data included in each audio frame of the audio stream and obtain the audio data, and a caption data generating section configured to segment the audio data corresponding to the predetermined sound unit from the audio data obtained by the decoding section, perform a text conversion, and generate caption data on the basis of the tag information.

(18) A receiving method including:

a receiving step of receiving, by a receiving section, a container stream of a predetermined format including an audio stream in which an audio frame including audio compression data is continuously arranged, in which the audio frame including the audio compression data of a predetermined sound unit includes tag information indicating that the audio compression data of the predetermined sound unit is included, the receiving method, further including a processing step of performing a process of the audio stream by using the tag information.

(19) A receiving apparatus including:

a receiving section configured to receive a container stream of a predetermined format including an audio stream in which an audio frame including audio compression data is continuously arranged, in which the audio frame including the audio compression data of a predetermined sound unit includes tag information indicating that the audio compression data of the predetermined sound unit is included, a layer of the container stream and/or a layer of the audio stream includes table information having information associated with the predetermined sound unit within the audio stream, the receiving apparatus, further includes a control section configured to control the received container stream to be written in a storage, the container stream to be read from the storage, and the audio stream included in the read container stream to be processed, and the control section controls the container stream to be read from the storage on the basis of information associated with the predetermined sound unit included in the table information.

(20) A receiving method including:

a receiving step of receiving, by a receiving section, a container stream of a predetermined format including an audio stream in which an audio frame including audio compression data is continuously arranged, in which the audio frame including the audio compression data of a predetermined sound unit includes tag information indicating that the audio compression data of the predetermined sound unit is included, a layer of the container stream and/or a layer of the audio stream includes table information having information associated with the predetermined sound unit within the audio stream, the receiving method, further includes a writing control step of controlling the received container stream to be written in a storage, a reading control step of controlling the container stream to be read from the storage, a processing step of performing a process of the audio stream included in the read container stream, and in the reading control step, the container stream is controlled to be read from the storage on the basis of information associated with the predetermined sound unit included in the table information.

A main feature of the present technology is that tag information indicating that audio compression data of a predetermined sound unit is included is inserted into the audio frame including the audio compression data of the predetermined sound unit and is transmitted, and thereby it is easy to segment the audio data corresponding to the predetermined sound unit and use the audio data for a sound output, a caption display, or the like on the basis of the tag information on a receiving side (refer to FIG. 5 and FIG. 7).

REFERENCE SIGNS LIST

10 . . . Transmitting and receiving system
100 . . . Service transmitter
110 . . . Stream generating section
111 . . . Control section
111a . . . CPU
112 . . . Video encoder
113 . . . Audio encoder
114 . . . Multiplexer
200 . . . Service receiver
201 . . . Receiving section
202 . . . Demultiplexer
203 . . . Video decoding section
204 . . . Video processing circuit
205 . . . Panel driving circuit
206 . . . Display panel
207 . . . OSD section
214 . . . Audio decoding section
215 . . . Audio output processing circuit
216 . . . Speaker system
221 . . . CPU
222 . . . Flash ROM
223 . . . DRAM
224 . . . Internal bus
225 . . . Remote control receiving section
226 . . . Remote control transmitter
231 . . . Local storage
232 . . . Communication interface
241 . . . Network
242 . . . Online storage
251 . . . Decoder
252 . . . Object renderer
253 . . . Mixer
254 . . . Audio data segmenting section
255 . . . Audio data & tag buffer
256 . . . Text conversion/caption display section

The invention claimed is:

1. A transmitting apparatus comprising:
a stream generating section configured to generate an audio stream in which an audio frame including audio compression data obtained by performing encoding processing on audio data is continuously arranged;
an information inserting section configured to insert tag information indicating that the audio compression data of a predetermined sound unit is included into the audio frame including the audio compression data of the predetermined sound unit; and
a transmitting section configured to transmit a container stream of a predetermined format including the audio stream into which the tag information is inserted.

2. The transmitting apparatus according to claim 1, wherein
the tag information has type information indicating that a start position of the audio compression data of the predetermined sound unit is included, an end position thereof is included, or neither of the start position and the end position is included.

3. The transmitting apparatus according to claim 2, wherein
the tag information has offset information indicating an offset of a sample unit from a frame head to the start position when the type information indicates that the start position is included and indicating an offset of a sample unit from a frame head to the end position when the type information indicates that the end position is included.

4. The transmitting apparatus according to claim 1, wherein
the tag information has frame count information indicating a frame position from a service head of the audio frame into which the tag information is inserted.

5. The transmitting apparatus according to claim 1, wherein
when the predetermined sound unit is provided in plurality, the tag information has sound unit identification information for identifying a corresponding sound unit.

6. The transmitting apparatus according to claim 1, wherein
when the predetermined sound unit is provided in plurality and sound units of a plurality of generation sources are included in the plurality of sound units, the tag information has generation source identification information for identifying the generation source of the corresponding sound unit.

7. The transmitting apparatus according to claim 1, wherein
the stream generating section performs encoding processing on the audio data of a plurality of groups and generates the audio stream in which the audio frame including the audio compression data of the plurality of groups is continuously arranged, and
the tag information has group identification information for identifying a group to which the audio compression data of the predetermined sound unit belongs.

8. The transmitting apparatus according to claim 7, wherein
when a group indicated by the group identification information is a group constituting a predetermined switch group, the tag information has switch group identification information for identifying the predetermined switch group.

9. The transmitting apparatus according to claim 1, wherein
the information inserting section further inserts table information having information associated with the predetermined sound unit within the audio stream into a layer of the container stream and/or a layer of the audio stream.

10. The transmitting apparatus according to claim 9, wherein
when the predetermined sound unit is provided in plurality, information associated with the plurality of sound units has sound unit identification information for identifying the corresponding sound unit, individually.

11. The transmitting apparatus according to claim 9, wherein
when the predetermined sound unit is provided in plurality and the sound units of a plurality of generation sources are included in the plurality of sound units, information associated with the plurality of sound units has generation source identification information for identifying a generation source of the corresponding sound unit, individually.

12. The transmitting apparatus according to claim 9, wherein
information associated with the predetermined sound unit has frame count information indicating a frame position from a service head of the audio frame including the audio compression data of the predetermined sound unit.

13. A transmitting method comprising:
generating an audio stream in which an audio frame including audio compression data obtained by performing encoding processing on audio data is continuously arranged;
inserting tag information indicating that the audio compression data of a predetermined sound unit is included into the audio frame including the audio compression data of the predetermined sound unit; and
transmitting, by a transmitting section, a container stream of a predetermined format including the audio stream into which the tag information is inserted.

14. A receiving apparatus comprising:
a receiving section configured to receive a container stream of a predetermined format including an audio stream in which an audio frame including audio compression data is continuously arranged, wherein
the audio frame including the audio compression data of a predetermined sound unit includes tag information indicating that the audio compression data of the predetermined sound unit is included,
the receiving apparatus, further comprising
a processing section configured to perform a process of the audio stream by using the tag information.

15. The receiving apparatus according to claim 14, wherein
the processing section includes
a decoding section configured to perform decoding processing on the audio compression data included in each audio frame of the audio stream and obtain audio data, and
a data segmenting and holding section configured to segment the audio data corresponding to the predetermined sound unit from the audio data obtained by the decoding section and hold the audio data in a buffer on the basis of the tag information.

16. The receiving apparatus according to claim 15, wherein
the processing section further includes a data output section configured to read and output the audio data corresponding to the predetermined sound unit from the buffer on the basis of operational information of a user.

17. The receiving apparatus according to claim 14, wherein
the processing section further includes
a decoding section configured to perform decoding processing on the audio compression data included in each audio frame of the audio stream and obtain the audio data, and
a caption data generating section configured to segment the audio data corresponding to the predetermined sound unit from the audio data obtained by the decoding section, perform a text conversion, and generate caption data on the basis of the tag information.

18. A receiving method comprising:
receiving, by a receiving section, a container stream of a predetermined format including an audio stream in which an audio frame including audio compression data is continuously arranged, wherein
the audio frame including the audio compression data of a predetermined sound unit includes tag information indicating that the audio compression data of the predetermined sound unit is included,
the receiving method, further including
performing a process of the audio stream by using the tag information.

* * * * *